United States Patent [19]

Tanaka et al.

[11] Patent Number: 5,375,237
[45] Date of Patent: Dec. 20, 1994

[54] COMPUTERIZED METHOD OF CREATING A CONVENIENT DICTIONARY REPRESENTING DATA STRUCTURES FOR USE BY A PLURALITY OF PROGRAM PRODUCTS

[75] Inventors: Kazuaki Tanaka, Sagamihara; Noriyuki Takahashi, Sakai; Toshio Akiba, Osaka, all of Japan

[73] Assignee: Hitachi, Ltd., Tokyo, Japan

[21] Appl. No.: 102,709

[22] Filed: Aug. 5, 1993

Related U.S. Application Data

[63] Continuation of Ser. No. 563,405, Aug. 6, 1990, abandoned.

[30] Foreign Application Priority Data

Aug. 9, 1989 [JP] Japan .................. 1-206089

[51] Int. Cl.$^5$ ............................................. G06F 7/00
[52] U.S. Cl. ....................... 395/650; 364/975; 364/962
[58] Field of Search .................. 395/650; 364/975, 962

[56] References Cited

U.S. PATENT DOCUMENTS

| | | | |
|---|---|---|---|
| 4,775,956 | 10/1988 | Kaji et al. | 364/900 |
| 4,819,160 | 4/1989 | Tanaka et al. | 364/300 |
| 4,833,597 | 5/1989 | Wakayama et al. | 364/200 |
| 4,979,109 | 12/1990 | Tanaka et al. | 364/200 |
| 5,129,082 | 7/1992 | Tirfing et al. | 395/600 |

OTHER PUBLICATIONS

HITAC Program Product VOS 3 Data Management System XDM 8090-6-602-30, Hitachi, Ltd., pp. 9-18. (Provided in Japanese).

Journal of Information Processing Society, vol. 29, No. 3, 1988, pp. 215-224. (Provided in Japanese).

*Primary Examiner*—Kevin A. Kriess
*Assistant Examiner*—A. Katbab
*Attorney, Agent, or Firm*—Fay, Sharpe, Beall, Fagan, Minnich & McKee

[57] ABSTRACT

A computer system comprises program products represented by a database management system, a first dictionary for registering and managing the definition data required for executing each of the program products and a second dictionary for storing and managing the structure definition data of the first dictionary. Each of the program products, for example a database system and a system development support tool, has added thereto in advance their structure definition data relating to all the definition data including the data required for executing each of the program products. The computer system creates the first dictionary on the basis of the structure definition data held by the program products in response to the demand for creating the first dictionary.

25 Claims, 15 Drawing Sheets

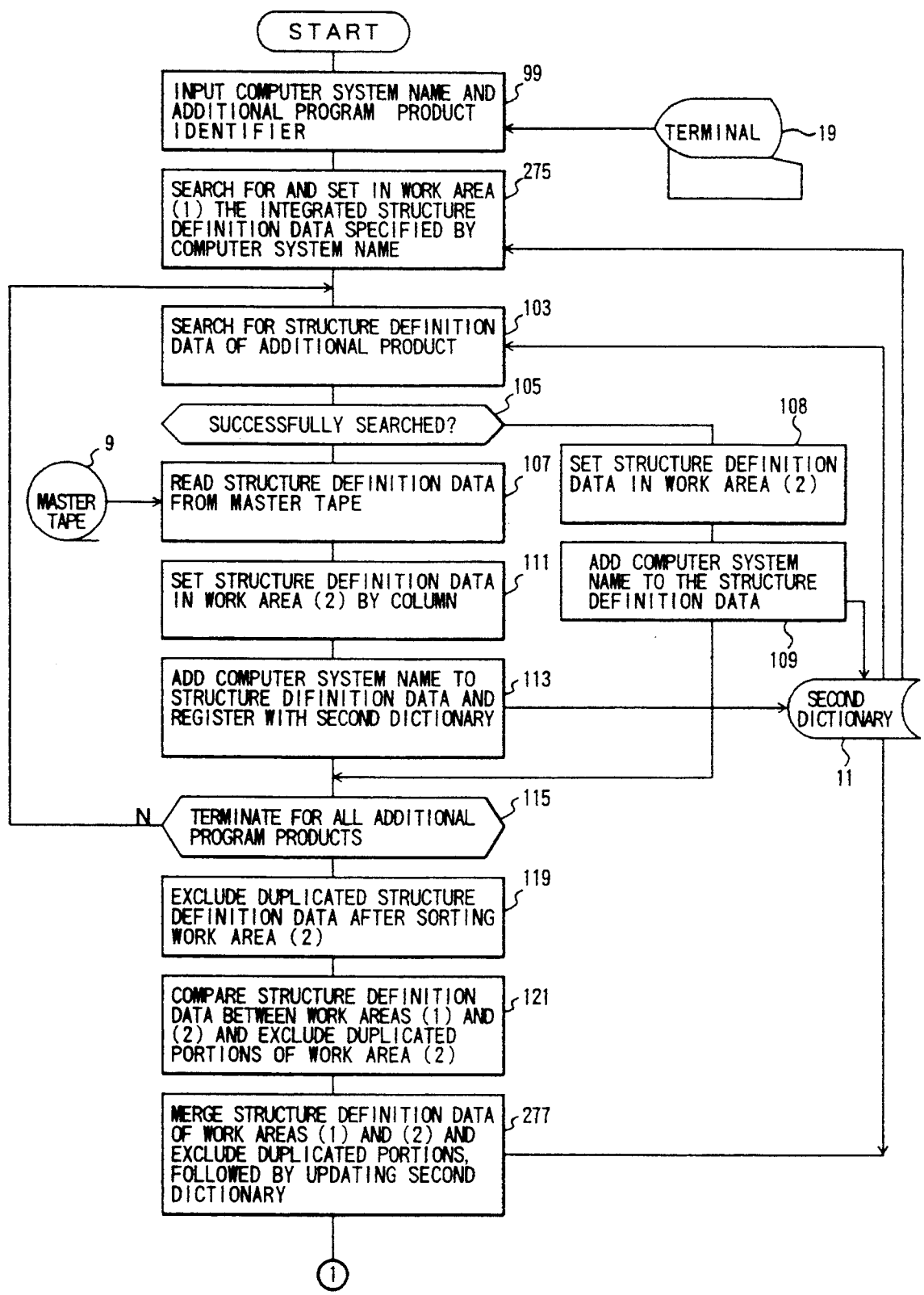

COMPUTERIZED METHOD OF CREATING A CONVENIENT DICTIONARY REPRESENTING DATA STRUCTURES FOR USE BY A PLURALITY OF PROGRAM PRODUCTS

This is a continuation of U.S. application Ser. No. 07/563,405 filed Aug. 6, 1990, now abandoned.

BACKGROUND OF THE INVENTION

The present invention relates to a method of managing definition data for specifying the manner of executing a program product to realize a computer system, or more in particular to a method of creating a dictionary for integral management of all definition data related to a computer system.

A program product making up a computer system (a generic name of software supplied from makers or software houses or the like, typically including an operating system or a data base management system), in order to make its manner of use more flexible, generally has a software structure operating on the basis of a definition data related to a method of execution designated by the user. As a result, each program product is accompanied by a definition data corresponding thereto.

Each program product, which is organized in a computer system, executes on the basis of a definition data responding thereto. Functions are necessary, therefore, to manage the definition data of the program product used, that is to say, to register a data definition, to refer to a data (or to make inquiry and answer thereto as to which data is used by which program) and to delete such data. The dictionary system is a data management for realizing such functions.

In view of the ever-increasing volume and multiplication of the information handled by a computer system, it is now necessary to strengthen the data management system and realize a dictionary system capable of fully meeting the requirements of system expansion and structure modification by accurately grasping the relationship (the causality) between a vast amount definition data.

In the prior art, a definition data management system is supplied for each program product separately, or as a common function for several related program products as described in Comments 8090-6-602-30, Management System XDM for HITAC Program Product VOS3, Hitachi Ltd., pp. 9–18.

With regard to a method of managing definition data, on the other hand, as discussed in Journal of Information Processing Society, Vol. 29, No. 3 (1988), pp. 215-224, the International Organization for Standardization (hereinafter referred to "ISO") proceeding with the work to prepare an international standard on a dictionary (hereinafter referred to as "the second dictionary") for registering and managing the definition data (hereinafter referred to as "the structure definition data") which are used to create a dictionary (hereinafter referred to as "the first dictionary") for registering and managing the definition data which are used to create a user database In the process, a method of versatile management of definition data is being under consideration in which a structure definition data is registered in the second dictionary, and the first dictionary is created on the basis of such a data in order to appropriately expand the types and the like of the definition data managed as a dictionary.

The conventional definition data management system for program products has posed a problem that in the case where several definition data management systems are available for each program product or for each group of related program products, the same definition data is required to be registered in duplication in such systems or trouble is encountered when there is a need of operation while matching several identical definition data with each other.

The ISO information Resource Dictionary System hereinafter referred to as "IRDS"), on the other hand, with the object of integral management of computer system definition data, standardizes the models for indicating the structure of the first and second dictionaries and the usage of a service protocol therefor. The type of the definition data managed by the first dictionary, the contents of the structure definition data managed by the second dictionary and the source of the data, are a problem the solution of which is left up to the person who implements the system.

If an integral management of all the definition data for a computer system is to be realized by the first dictionary, for example, it is necessary to register with the second dictionary a structure definition data for the definition data required for execution of the program product making up the computer system. This definition data required for execution of a program product depend on the functions of the particular program product and are not uniform. A database management system, for instance, has the type of definition data required for execution, which varies from one supplier to another. Also, the database management systems supplied by the same supplier may have different types of definition data in accordance with the version or revision.

Further, the type and number of the program products constituting a computer system vary with the specification of the work realized by the particular computer system.

Furthermore, in the conventional definition data management systems, a data dictionary (the first dictionary in the present Specification) is realized as a database. Therefore, a structure definition data for the database is also supplied from the supplier or the like.

As mentioned above, in order to realize an integral management of all the definition data for a computer system by use of dictionaries, the supplier is required to supply a management system for the structure definition data in accordance with the program product structure of the computer system. This is inconvenient not only to the supplier but to the user who modifies the program product structure of his computer system in accordance with the work specification or employs a program product structure with the same multi vendor.

In addition, a management system for a monitor data or an operation data such as a management data for the location and use of a storage medium is realized individually separate from the definition data management system and therefore cannot be integrally managed by relating the definition data and the operation management data to each other.

SUMMARY OF THE INVENTION

The object of the present invention is to provide a method of creating a dictionary which obviates the problem of the prior art and in which the definition data and the operation data of a computer system realized by a variety of combinations of program products are capable of being integrally managed by a first dictionary, thereby realizing an efficient definition data management system saving the duplication of definition data registration and the trouble of managing the matching between definition data.

In order to achieve the above-mentioned object, there is provided according to the present invention a method of dictionary creation for a computer system comprising program products represented by a database management system, a first dictionary for registering and managing the definition data and operation data required for executing each of the program products, and a second dictionary for storing and managing the structure definition data of the first dictionary, in which each program products, for example, a system development support tools and a database management system, has added thereto a structure definition data for the definition data and the operation data required for executing each of the program products, this added structure definition data is stored, and a first dictionary is created on the basis of the structure definition data of the program products in response to a first dictionary creation demand.

DESCRIPTION OF THE PREFERRED EMBODIMENTS

Figure 1:
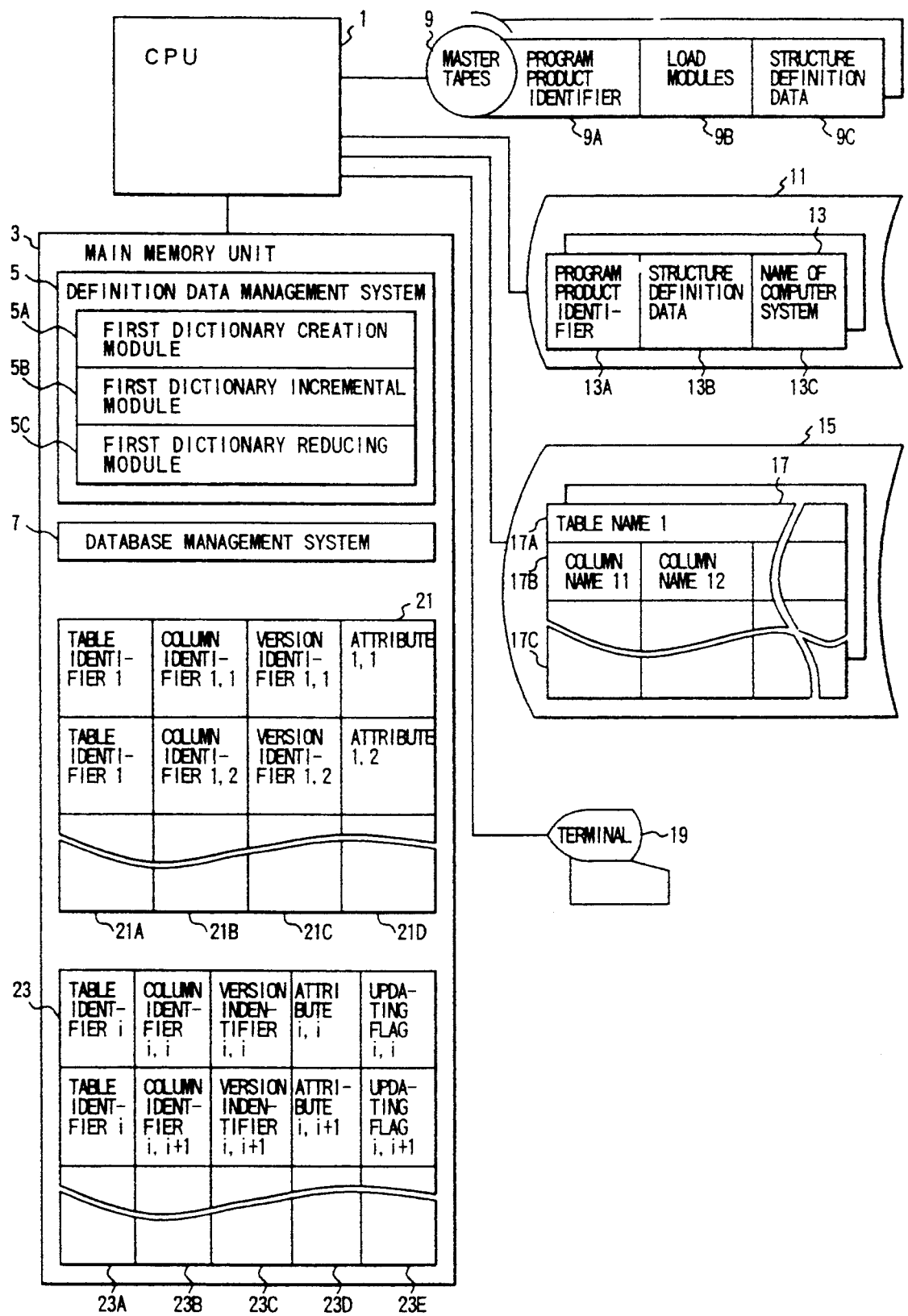
FIG. 1 is a block diagram showing a general configuration of a computer system according to a first embodiment of the present invention.

First, the present invention will be generally described.

According to the present invention, each program product is supplied from a program product supplier together with a structure definition data for defining the operation data and the definition data (hereinafter collectively referred to as "the definition data" for facilitating the understanding) specifying the nature of execution of the particular program product. This structure definition data is comprised of the table and column names in a first dictionary for registering the definition data, version identifier (generation and the like), data type (English, numerals, Kanji, etc.), limiting conditions (data length, etc.), default data and the like. The structure definition data may be supplied either in master tape or the like or a means separate from a program product such as magnetic disk or magnetic tape which could be identified as a structure definition data for a particular program product. The structure definition data of a program product inputted by any of the aforementioned means is checked for duplication, on the basis of the table and column names, the version identifier and the data type in that order. Any duplication that may be found is excluded and integrated according to predetermined conditions.

The structure definition data thus integrated which have the same table name are combined, and by using the description language, a definition data for creating the first dictionary is automatically prepared, so that the first dictionary is created through a database management system on the basis of the definition data thus automatically prepared.

The structure definition data may be stored separately in the master tape of the program products. Also, in the case where several related program products are combined and "integrally shipped", the structure definition data may be stored collectively in one of the related program products. In such a case, the structure definition data are read from the master tape having stored therein the structure definition data collectively at the time of creating the first dictionary.

When the first dictionary is actually created, a demand for creation is issued by designating the name of the program product involved and a program product group including the particular program product (the name of a computer system executed by the particular program product).

Further, any duplicated structure definition data are excluded at the time of creating the first dictionary.

Also, when the first dictionary is incremented with the addition of a program product, that portion of the additional program product which is duplicated within the structure definition data of the existing first dictionary is excluded.

In the case of reducing the first dictionary with the deletion of a program product, in contrast, only those structure definition data for the program product required to be deleted which are not shared with the structure definition data of the other program products are deleted.

The operating principle of the present invention will be explained below.

In the present invention, a computer system or managing a first dictionary (hereinafter referred to as "the management computer system") operates in the manner mentioned below to create a first dictionary meeting a program product configuration.

I (1) In addition to programs, the supplier of each program product supplies a structure definition data to create a first dictionary in which a definition data and operation data for executing its program product are registered and managed.

These data are supplied in a storage medium called the master tape in the same manner as a program product is conventionally supplied by the maker or the like.

To the extent that a data is identifiable as a structure definition data for a program product, a master tape separate from the program product may be used to supply the structure definition data separately or collectively. In the case of shipping related program products collectively in what is called the integral shipment, on the other hand, the structure definition data of one program product may be supplied as a representative of all the program products in the integral shipment.

The structure definition data for each definition data is comprised of the names of the table and column for registering the definition data, version (generation) identifier and such attributes as data type (English, numerical value, kanji, etc.), limiting conditions (data length, etc.) and abbreviation interpretation data.

(2) This structure definition data is inputted into a main memory unit of the management computer system through a magnetic tape unit or the like from the program product master tape making up the computer system.

(3) Of all the structure definition data inputted in (2) above, those having the same combination of table and column names are excluded from duplicated registration and integrated as follows:

(a) One of such data is excluded if they have the same version identifier.

(b) One of the data is matched to the other longer one if they fail to coincide only in version identifier and column length at the same time.

(c) The limiting conditions are relaxed if they fail to coincide only in version identifier and limiting conditions at the same time.

(d) The data with a new version is left effective in all the other cases.

(4) The structure definition data thus integrated and having the same table name are combined.

(5) In accordance with the process (4) above, a definition data for creating a first dictionary is automatically prepared by use of a data definition language or data description language (hereinafter referred to as "DDL") or a schema definition language providing a relational data base description language.

In the case of a data base conforming to NDL (Network Database Language), which provides one of the enquiry languages of the network database standardized by ISO, for example, a definition data with each table of (4) above as a <record type> is prepared.

In similar fashion, in the case of a database conforming to SQL2 (Structured Query Language 2) which is a relational database description language standardized by ISO, on the other hand, a definition data with each table of (4) above as a <table definition> is prepared.

(6) The definition data for creating the first dictionary is sent to the data base management system to create the first dictionary.

II

In (2) of (I) above, the functions mentioned below facilitate the operation by reading the structure definition data not through a magnetic tape unit from the master tape of each program product each time but from the second dictionary in the management computer system.

(1) The structure definition data in the master tape of each program product is registered with the second dictionary with a program product identifier as a key.

(2) The second dictionary is searched for the structure definition data in response to the user inputting a computer system configuration with a program product designated.

(3) Similar to (3) of (I) and subsequent processes.

III

The functions mentioned below expand (increment) the structure of the first dictionary for increasing the types of definition data of the program products manageable by the existing first dictionary. As a result, with the increase in the program products making up component elements of the computer system, the need of recreation of the first dictionary is eliminated.

(1) In response to an identifier of a program product making up a computer system and the name of the particular computer system inputted from the user, the name of the computer system is added to each structure definition data in the second dictionary as a data indicating the relation between the program product and the computer system. The first dictionary is created in the same manner as in (II).

(2) In response to an expansion (incrementation) request for the first dictionary from the user designating the name of a computer system and the identifier of the program product added to the computer system, the second dictionary is searched for the structure definition data of the program product making up the computer system and the new program product added thereto.

(3) The structure definition data of the program products making up the existing computer system are subjected to the same exclusion process as mentioned in (3) of (II) above for integration.

(4) The structure definition data of a new program product added is compared with that integrated in (3), and those having the same combination of table and column names are further subjected to the process of excluding duplication for integration.

(a) The new program product having the same version identifier as the integrated structure definition data is excluded.

(b) The new program product which has a version identifier not identical to that of the integrated structure definition data but identical in all other features except a shorter column is excluded.

(c) The structure definition data which has the same version identifier as the integrated structure definition data other than less restrictive limiting conditions is excluded.

(5) The structure definition data integrated in (4) above which have the same table name are combined.

If both a structure definition data with added program products and an integrated definition data have the same table and column names, the former is employed. Also, if there are a plurality of added program products having the same table and column names, then the newer version of them is employed.

(6) On the basis of (5) above, a definition data for incrementing the structure of the first dictionary is automatically prepared by use of the DDL of the data base realizing the first dictionary or the schema manipulation language as in (5) of (I).

(7) The definition data for incrementing the first dictionary is sent to the data base management system to increment the first dictionary.

In this incremental process, the definition data in the first dictionary may be saved temporarily into another memory medium before automatically creating the first dictionary and returning the definition data thereto in what is called a reconfiguration, or may not be so saved, in accordance with the basic operating functions of the data base management system.

IV

Further, the functions mentioned below decrease the types of definition data managed by the existing first dictionary, thereby reducing the structure of the first dictionary. As a result, the need of recreating the first dictionary is eliminated by suspending the use of the program product making up a component element of the computer system.

(1) In response to a user's request for reducing the first dictionary designating the name of a computer system and an identifier of a program product to be deleted from the computer system, the second dictionary is searched for the structure definition data of a program product constituting the computer system.

(2) The structure definition data of the program products making up the computer system other than those to be deleted are subjected to the integration described in (3) of (I) above.

(3) The structure definition data integrated in (2) above is compared with that of the program product to be deleted, thereby extracting only those structure definition data of the program product which have a specific combination of table and column names not found in the integrated structure definition data.

(4) The structure definition data integrated in (2) above is compared with that of the program product to be deleted, thereby extracting those structure definition data which have the same combination of table and column names.

As the next step, only the structure definition data, meeting the following conditions are extracted:

(a) If and, the column length of the structure definition data to be deleted is shorter.

(b) If the limiting conditions of the structure definition data to be deleted are stricter.

(5) On the basis of the structure definition data extracted in (3) above, a definition data for reducing the structure of the first dictionary is automatically prepared by use of the schema operation language or DDL of the data base for realizing the first dictionary in the same manner as in (5) of (I).

(6) On the basis of the structure definition data extracted in (4) above, a definition data for altering the structure of the first dictionary is automatically prepared by use of the schema operation language or DD1 of the data base for realizing the first dictionary in the same manner as in (5) of (I) above.

(7) The reducing or altering definition data for the first dictionary automatically prepared in (5) and (6) above are sent to the data base management system to reduce or alter the structure of the first dictionary.

In the aforementioned process of reduction or alteration, as a method of incrementation, the definition data in the first dictionary may be saved temporarily into another memory medium before creating the first dictionary automatically and returning the same data to the first dictionary in what is called a reconfiguration, or alternatively may not be so saved, depending on the basic data operating functions of the data base management system.

According to the functions mentioned above, it is possible to create a first dictionary conforming to the program product configuration of a computer system thereby to integrate the management of all the definition data and operation data of the computer system having program products variously configured in accordance with the nature of the work involved.

The feature mentioned above saves the trouble of managing the matching of duplicate definition data registered for a program product. Further, the definition data may be related to the operation data for the purpose of management.

Now, an embodiment of the present invention will be explained in detail with reference to the drawings.

FIG. 1 is a block diagram showing a general configuration of a computer system according to the present invention.

This computer system comprises a central processing unit (hereinafter referred to as "the CPU") 1 for controlling the system as a whole, a main memory unit 3 for storing programs, master tapes 9 providing a medium of supplying program products, a second dictionary 11 for registering and managing structure definition data, a first dictionary 15 for registering and managing definition data, and a terminal unit 19 for inputting a request from the user.

The main memory unit 3 has stored therein the following devices;

A definition data management system 5 including a program for processing a request to install the creation, incrementation or reduction of a first dictionary such as a first dictionary creating module 5A, a first dictionary incremental module 5B and a first dictionary reducing module 5C, a database management system 6 having the management functions of defining, preparing, recompiling or operating the database providing a program for overall management of the database, a table identifier 21A, a column identifier 21B, a version identifier 21C and an attribute 21D, and a work area (1) 21 for setting a structure definition data.

In similar fashion, the main memory unit 3 has stored therein a work area (2) 23 including a table identifier 23A, a column identifier 23B, a version identifier 23C, an attribute 23D and an updating flag 23E for setting a structure definition data.

The attribute 21D includes a column length, a data type, integrity constraints (unique constraint, referential constraint and check constraint) and default data. The table or column name of the first dictionary may also be used as an attribute.

The master tapes 9 include a program product identifier 9A, load modules 9B for the program product, and a structure definition data 9C for defining the structure in the first dictionary of the definition data for specifying a method of executing the program product, data for monitoring the execution, and an operation data for managing the location and use of a memory medium (hereinafter collectively referred to as "the definition data"). This configuration, supplying program products and load modules integrally, has a practical advantage of facilitating the management of a computer system. The structure definition data for each program product may of course be supplied with the particular program product, or separately from each program product, or individually or collectively, as far as the structure definition data is understood to be associated with a program product. A given program product may alternatively be supplied as a representative structure definition data for several program products. The explanation of the present embodiment will be based on the assumption that the structure definition data is stored in a master tape.

The second dictionary 11, which is for registering and managing the structure definition data, is configured of structure definition data records 13 managed in accordance with the program products. These records include a program product identifier 13A, a structure definition data 13B and a name of the computer system 13C, which designates each system that will execute each program product. The computer system name 13C may be realized to set a plurality of computer systems.

The first dictionary 15, on the other hand, is for registering and managing the definition data, and is configured of definition data tables 17. The definition data tables 17, in turn, include a table name 17A, a column name 17B and a value 17C of the definition data for each column name 17B. A plurality of definition data values 17C may be set in realizing the first dictionary.

The terminal unit 19, as a means of inputting a request from the user, may be connected as a batch job other than in dialogue form. According to the present embodiment, the input in conversation form is employed by way of explanation.

Now, in the computer system according to the present embodiment, the user request for the definition data management system 5 is given from the terminal unit 19 in command form. A command configuration related to the present invention will be described below.

The creation command of the first dictionary is constructed as described below, for example.

¥CREATE
    [<Computer System Name>]
    <Program Product Identifier> where "¥CREATE" indicates that this command represents a request for creating the first dictionary. [<Computer System Name>] represents a name attached to the first dictionary and indicates that the definition data for a program product specified by <Program Product Identifier> is managed in the first dictionary having the particular name.

In the case where a program product has a generation identifier such as version or revision, the <Program Product Identifier> may be configured by the <Program Product Name> and <generation identifier>. In the description that follows, this identifier will be described simply as <Program Product Identifier> for purposes of explanation.

The dots ". . . " in a command indicates that a plurality of <Program Product Identifiers> may be designated.

The parenthesis [ ] indicates that < > may be omitted. If these parentheses are omitted, however, it is necessary that the definition data management system be capable of specifying the first dictionary in another command. There may be a case, for example, where there is only one first dictionary in a system. The explanation below deals with a case not omitting the <Computer System Name>.

A reducing command for the first dictionary is constructed, for example, as

¥ENHANCE
    [<Computer System Name>]
    <Program Product Identifier> where "¥ENHANCE" indicates that this command represents a request for incrementing the first dictionary. <Computer System Name> indicates that the first dictionary with this name attached thereto is the one to be incremented and that the definition data of a program product specified by <Program Product Identifier> is to be added to the first dictionary.

The deletion command for the first dictionary is constructed, for example, as

¥DROP
    [<Computer System Name>]
    <Program Product Identifier>

"¥DROP" indicates that this command represents a request for reducing the first dictionary. <Computer System Name> specifies the first dictionary to be reduced, and indicates that the definition data of the program product specified by <Program Product Identifier> will not be managed in the future.

The terminating command for various requests against the definition data management system 5 is constructed, for example, as

¥END which represents a command indicating that the user request for creating, incrementing or reducing the first dictionary be terminated. This command is provided to allow a user to terminate the processing of the definition data management system mentioned below. The process may be terminated for each command.

The name of each command may be in the form of other character train representing the intention thereof or a command representing a combination thereof.

Figure 2:
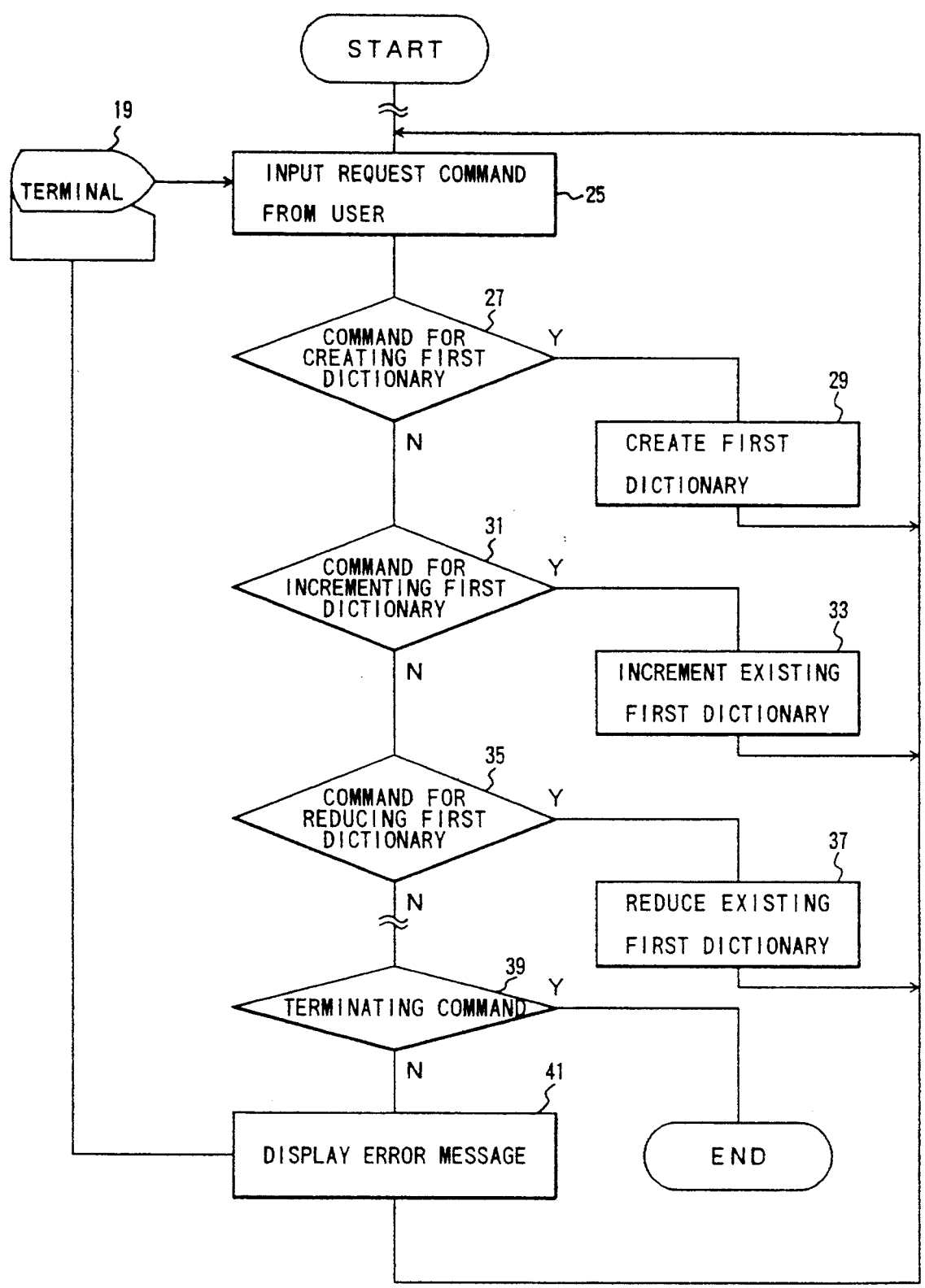
FIG. 2 is a flowchart showing a general processing sequence of a definition data management system shown in FIG. 1.

FIG. 2 is a flowchart showing an outline of the process of the definition data management system 5.

When the computer system according to the present embodiment is started and the request from the user is inputted (step 25), the particular command is checked if it is a creation command for the first dictionary or not (step 27). If it is a command for creating the first dictionary, the first dictionary creation module 5A (program) is started to create the first dictionary (step 29), after which the step 25 and subsequent steps are repeated. The operation for creating the first dictionary of step 29 will be described later.

If step 27 decides that a command is not for creating the first dictionary, it is decided whether the particular command is for incrementing the first dictionary or not (step 31). If the command is for incrementing the first dictionary, the first dictionary incremental module 5B (program) is started to increment the first dictionary (step 33), after which step 25 and subsequent steps are repeated. The operation for incrementing the first dictionary of step 33 will be described later.

If step 31 decides that an incremental command is not involved, it is then decided whether the particular command is for reducing the first dictionary or not (step 35). If it is a first dictionary reducing command, the first dictionary reducing module 5C (program) is started to reduce the first dictionary (step 37), followed by repetition of step 25 and subsequent steps. The operation for reducing the first dictionary will be described later.

If step 35 decides that the command is not for reduction, it is decided whether the particular command is for other functions (such as changing the table name), followed by the execution of the particular function.

In FIG. 2, only the decision on the terminating command (step 39) will be explained. If this command is for termination, the process of the definition data management system is terminated. If not, on the other hand, it is determined to be an undefined command, so that an error message is displayed in the terminal unit 19, followed by repetitions of step 25 and subsequent steps.

Figure 3:
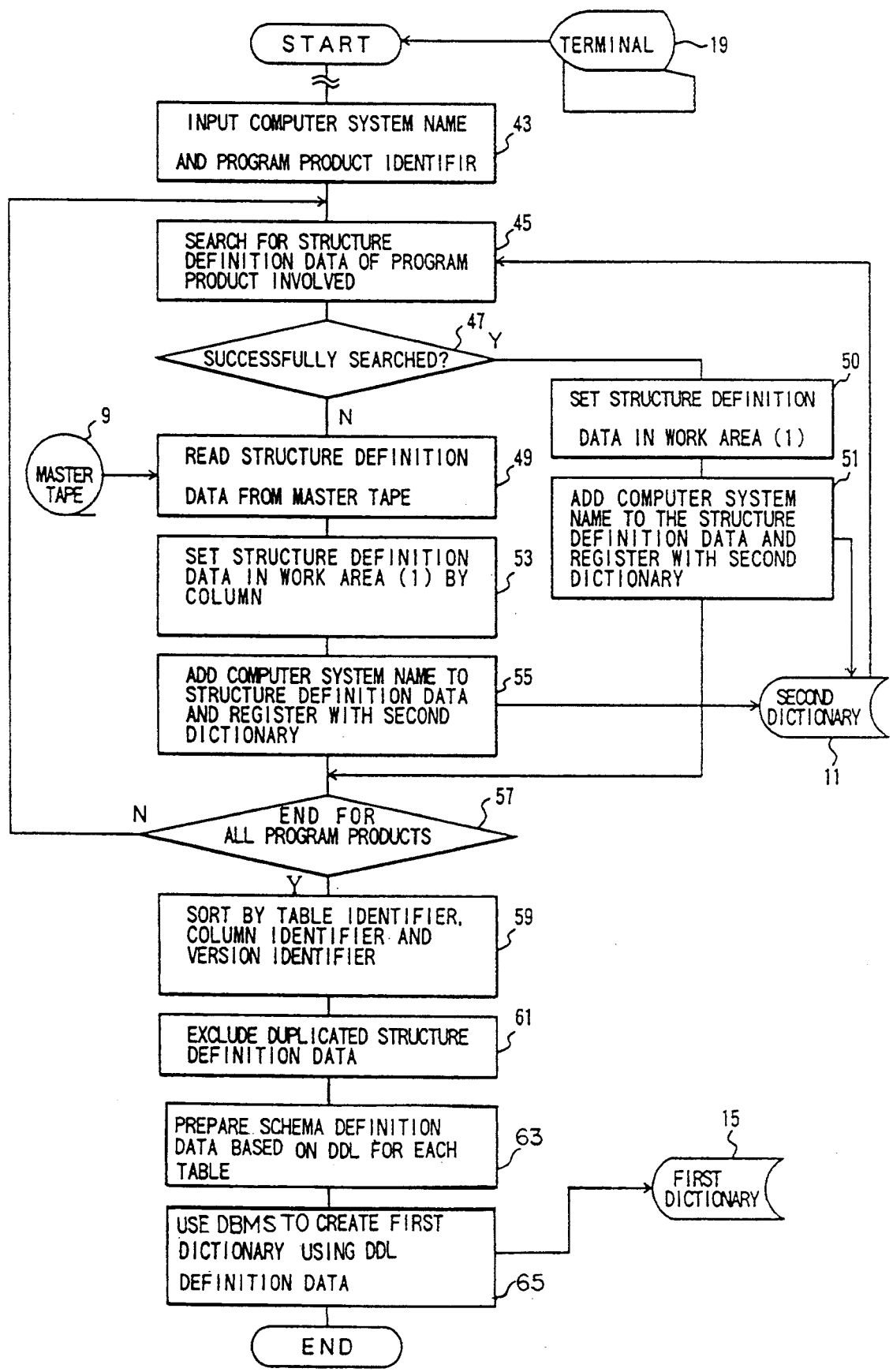
FIG. 3 is a flowchart showing a processing sequence of a module for creating the first dictionary of the computer system in FIG. 1.

FIG. 3 is a flowchart showing the sequence of processing the first dictionary creating module.

Upon invoking the first dictionary creating module, a program product identifier and a computer system name providing an operand of the first dictionary creating command are read from the terminal unit 19 (step 43). In this case, these factors may be alternatively read collectively at step 25 in FIG. 2. This is also the case with other commands.

As the next step, with regard to one of the program products designated, the second dictionary 11 is searched for the structure definition data thereof with the designated program product identifier as a key, by which data is stored in the work area (1) 21 (step 45). Whether the search is successful is decided (step 47), and if so, the designated computer system name is added to the structure definition data in the second dictionary (step 51), followed by the execution of step 57 and subsequent steps. Otherwise, the structure definition data is read from the master tape 9 which storing the program product (step 49), and the definition data is divided into columns and set in the work area (1) 21 (step 53). The designated computer system name is added to this structure definition data and registered with the second dictionary (step 55). With regard to all the designated program products, it is decided whether the structure definition data thereof is set in the work area (1) 21, and if not, step 45 and subsequent steps are repeated. If the structure definition data is set, the structure definition data of the work area (1) 21 is sorted the table identifier, column identifier and version identifier (step 59), followed by the exclusion of the structure definition data having the same combination of the table identifier and column identifier (step 61). The remaining structure definition data will be now called integrated structure definition data for discrimination.

On the basis of the integrated structure definition data, a schema definition data is generated for creating a first dictionary by the schema definition language supplied by the database management system 7 for realizing the first dictionary for each identical table identifier (step 63).

In the case of a database conforming to SQL (Structured Query Language 2) of ISO, for example, assume that the computer system name is $S_1$, the table name the table identifier $T_1$, the column names the column identifiers $C_1$ and $C_2$, both the columns data of character train type, and the data lengths are 4 and 8 respectively without any other attributes. Schema definition data as shown below are generated.

CREATE SCHEMA $S_1$
CREATE TABLE $T_1$
($C_1$ CHAR (4),
$C_2$ CHAR (8))

In this case, the table identifier is provided as the table name of a first dictionary table and the column identifier as the column name thereof. In the case where the table name or column name is considered as one of the attributes, however, the name thereof is designated as $T_1$ or $C_1$, $C_2$. This is also the case with the other commands.

The first dictionary 15 is created by sending this schema definition data to the database management system 7 for execution (step 65). The data management system 7 is conventional and the processing operation thereof will not be described.

Although the foregoing explanation is based on the SQL2 of ISO, another method of execution may be used which is based on NDL (Network Database Language) of ISO, other database definitions or operation language. In short, the basic functions of a database management system for realizing the first dictionary may be used for conversion into a command to create, increment or reduce the first dictionary. This also applies to the explanation that follows.

Figure 4:
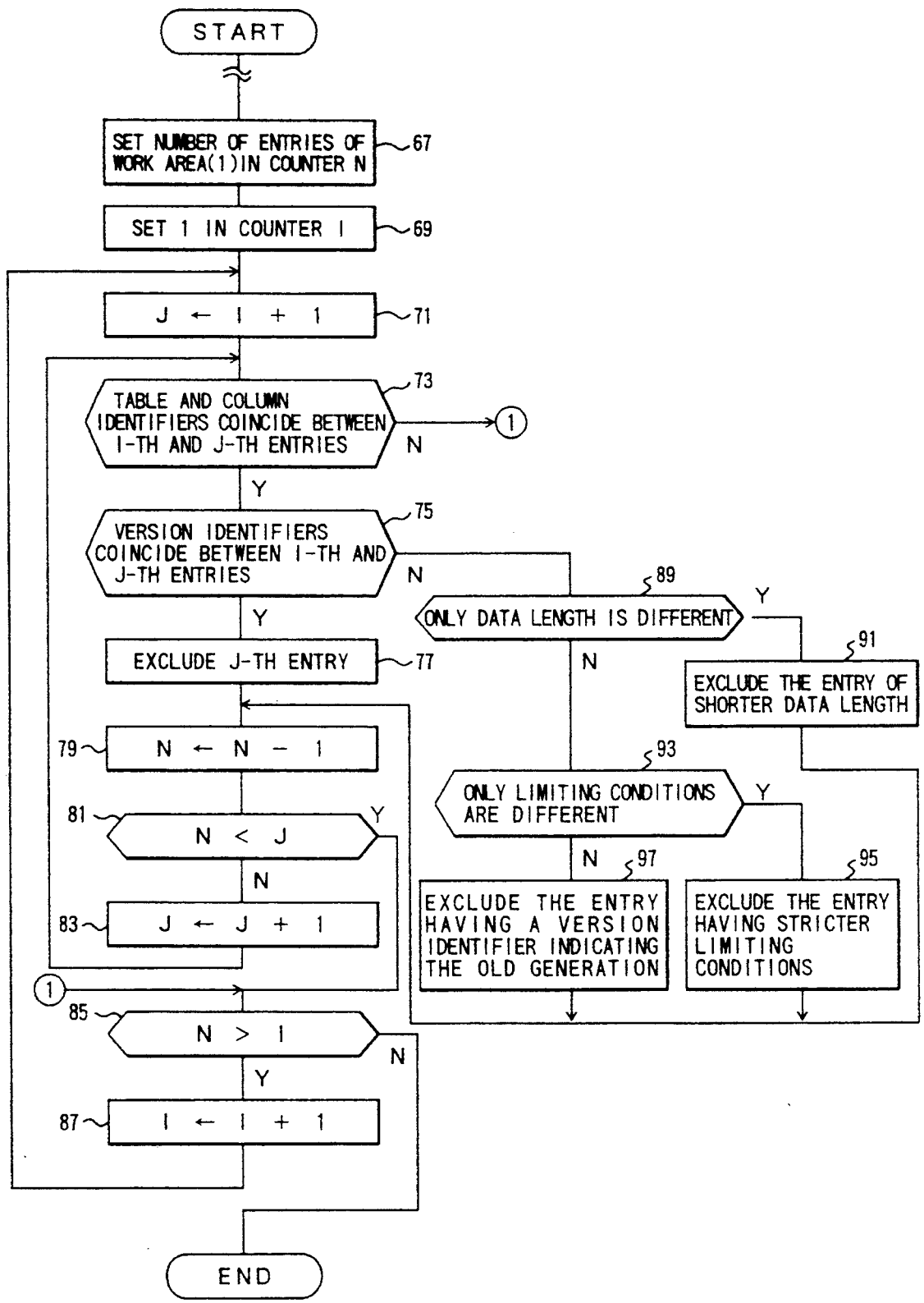
FIG. 4 is a flowchart showing the sequence of exclusion of duplicated structure definition data at step 61 shown in FIG. 3.

FIG. 4 is a flowchart showing the sequence of excluding duplicated structure definition data at step 61 in FIG. 3.

The number of entries of the work area (1) 21 is set in the counter N (step 67). The number 1 is set in the counter I (step 69). The value on the counter I plus 1 is set in the counter J (step 71), and it is decided whether the table identifier of the I-th entry of the work area (1) 21 coincides with the column identifier, and also whether the table identifier of the J-th entry with the column identifier (step 73). If they fail to coincide, steps 85 and subsequent steps are executed. Otherwise, it is decided whether the version identifier for the I-th entry of the work area (1) 21 coincides with that of the J-th entry (step 75). In the case of coincidence, the structure definition data of the J-th entry is deleted, and a succeeding entry, if any, is shifted toward smaller entry numbers by one each (step 77). The value of the counter N is reduced by 1 (step 79), followed by deciding whether the counter N is smaller than the counter J or not (step 81). If not, the value of the counter J is incremented by one (step 83), after which step 73 and subsequent steps are repeated. If the count N is smaller than the count J, on the other hand, it is decided that the counter N is larger than the counter I (step 85), while if the counter N is larger than counter j, the counter I is incremented by one, followed by repetition of step 71 and subsequent steps. If the counter N is not larger than the counter J, this process is terminated. Further, if the version identifier of the I-th entry of the work area (1) 21 fails to match with that of the J-th entry at step 75, it is then determined if only the data length is different and the data type remains the same of all the attributes (step 89). If only the data length is different, the shorter entry of the data is deleted, and succeeding entries, if any, are shifted by one each toward smaller entry numbers (step 91), after which step 79 and subsequent steps are executed. If both the data type and lengths are different, it is determined whether only the limiting conditions of all the attributes are different (step 93). In the case where only the limiting conditions are different, the entry with stricter limiting conditions is deleted, and succeeding entries, if any, are shifted by one each toward smaller entry numbers (step 95), after which step 79 and subsequent steps are executed. If other attributes are different in addition to limiting conditions, on the other hand, the entry with the version identifier indicating an older generation is deleted, and succeeding entries, if any, are shifted each by one toward smaller entry numbers (step 97), after which step 79 and subsequent steps are executed.

In the case where the version identifier of the I-th entry of the work area (1) 21 fails to coincide with that of the J-th entry at step 75, step 97 may be executed unconditionally or the user instruction may be followed through the terminal unit 19. As another alternative, step 89 or 93 may select a longer data length or relaxed limiting conditions or combine such attributes. In essence, only one of the table identifier and the column identifier which coincide with each other is left.

Figure 5A:
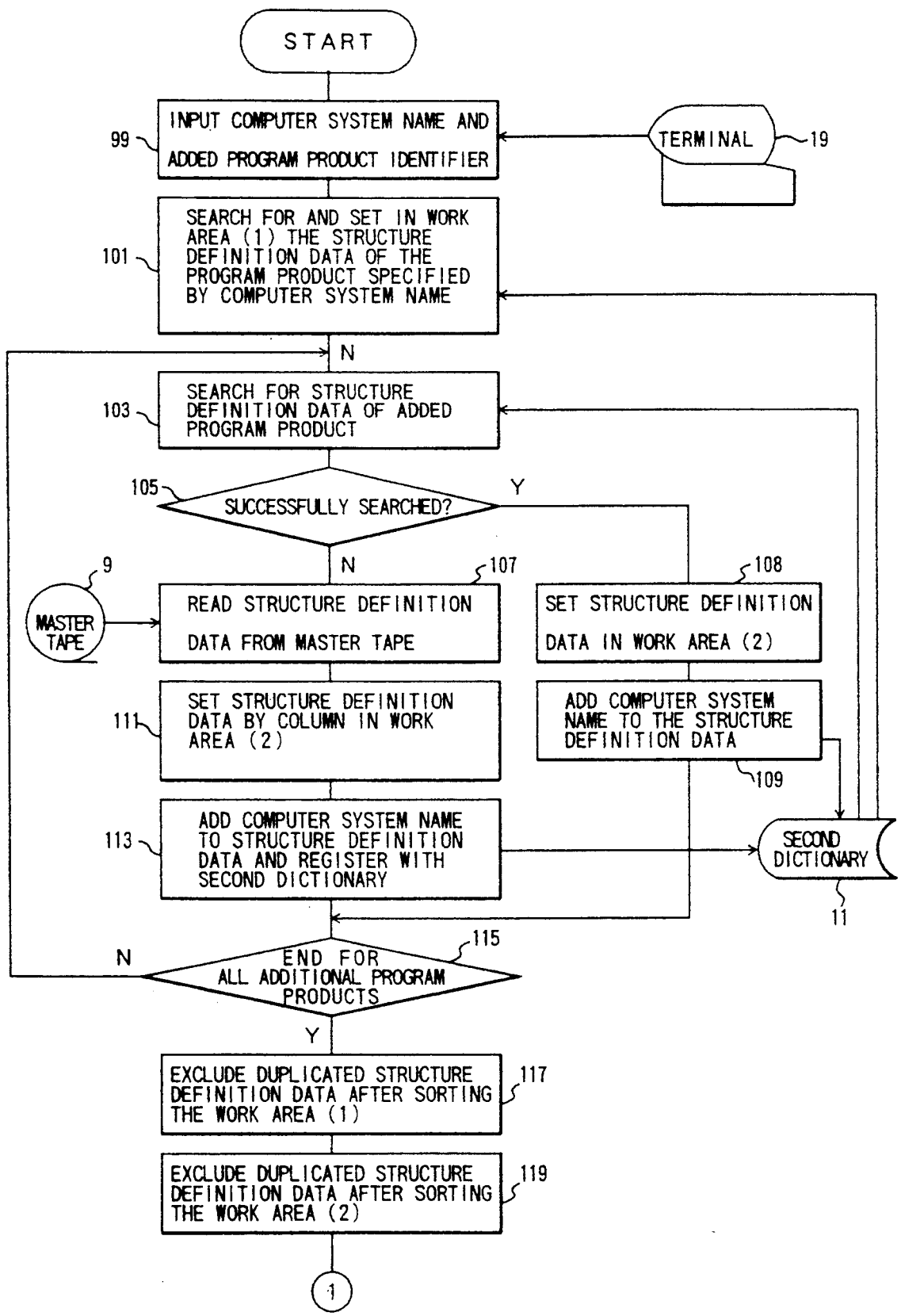
FIGS. 5A and 5B are flowcharts showing a processing sequence of a module for incrementing the first dictionary.
Figure 5B:
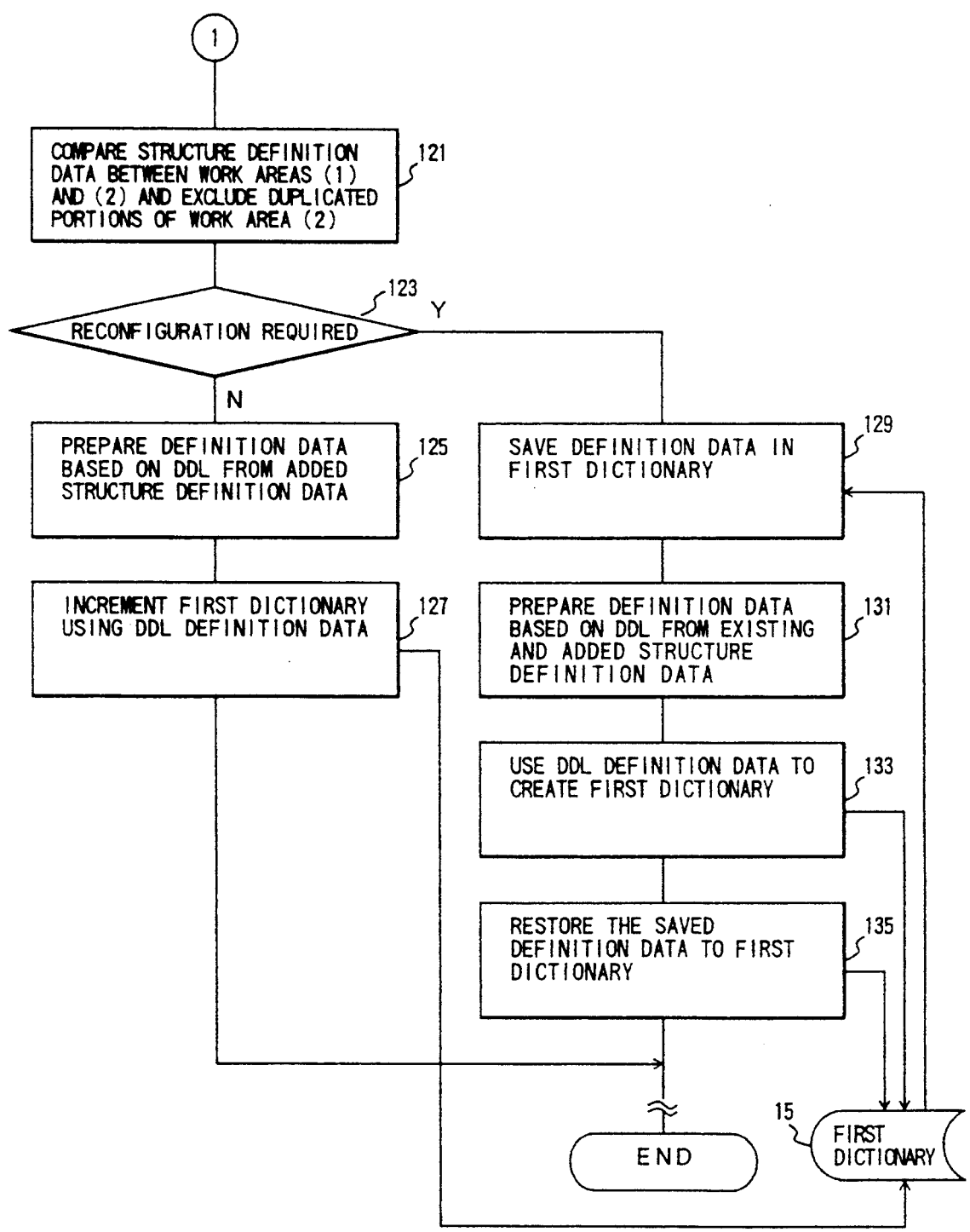

FIG. 5 is a flowchart showing the sequence of the processes for the first dictionary incremental module in the computer system of FIG. 1.

Upon invoking this module, the computer system name and an additional program product identifier which are operands (objects of instruction) of the first dictionary incremental command are read from the terminal unit 19 (step 99). With a designated computer system name as a key, the second dictionary is searched for a structure definition data of the program product specified by the computer system name, which data is set in the work area (1) 21 (step 101). As the next step, with a designated additional program product identifier as a key, the second dictionary is searched for a structure definition data, which is set in the work area (2) 23 (step 103). Whether the search was successful or not is decided (step 105), and if successful, the designated computer system name is added to the structure definition data in the second dictionary (step 109), after which step 115 and subsequent steps are executed. If the search is unsuccessful at step 105, the structure definition data is read from the master tape 9 having the program product stored (step 107), and is set in the work area (2) 23 by column units (step 111). This structure definition data, with the designated computer system name added thereto, is registered with the second dictionary (step 113). With regard to all additional program products designated, whether the structure definition data thereof is set in the work area (2) 23 is decided (step 115), and if not set, step 103 and subsequent steps are repeated. If set, on the other hand, the structure definition data of the work area (1) 21 is sorted by the table identifier, column identifier and the version identifier, so that the structure definition data having the same combination of the table identifier and the column identifier are deleted (step 117). This is similar to the processing at steps 59 and 61 for creating the first dictionary. This structure definition data is hereinafter called the existing integrated structure definition data for discrimination from the remaining structure definition data.

In similar fashion, the structure definition data of the work area (2) 23 are sorted by the table identifier, column identifier and version identifier, so that those structure definition data having the same combination of table and column identifiers are excluded (step 119). In order to discriminate the remaining structure definition data, such data are called the additional candidate integrated structure definition data. Of all the existing structure definition data and the additional candidate integrated structure definition data, those having the same table and column identifiers are excluded from the additional candidate integrated structure definition data (step 121). The remaining additional candidate integrated structure definition data is called the additional integrated structure definition data. It is decided whether the incrementation of the first dictionary by the additional integrated structure definition data requires the reconfiguration of the first dictionary (step 123). Whether the reconfiguration is required or not depends on the ability of the database management system. This embodiment is realizable regardless of whether the reconfiguration is required or not, as a result of adopting the method mentioned below.

If step 123 decides that the reconfiguration is not necessary, a schema manipulation data for incrementing the first dictionary is prepared by the schema manipulation language from the additional integrated structure definition data (step 125). The first dictionary is incremented by sending the schema manipulation data to the database management system 7 in FIG. 1 for execution (step 127).

If step 123 decides that the reconfiguration is required, the definition data in the first dictionary is saved (step 129). The place of saving may be either an external memory unit such as magnetic tape or magnetic disk not shown or an incremental memory unit or the main memory unit 3 shown in FIG. 1. The additional integrated structure definition data is added to the work area (1) 21 and sorted as in step 117, after which duplicated structure definition data are excluded, so that a schema definition data for creating the first dictionary is prepared by the schema definition language (step 131). The resulting data is sent to the database management system shown in FIG. 1 for execution thereby to create a new first dictionary (step 133).

In advance of the creation, the first dictionaries specified by the same computer system name are excluded.

As the next step, the saved definition data is reregistered with the first dictionary (step 135) thereby to increment the first dictionary.

Figure 6:
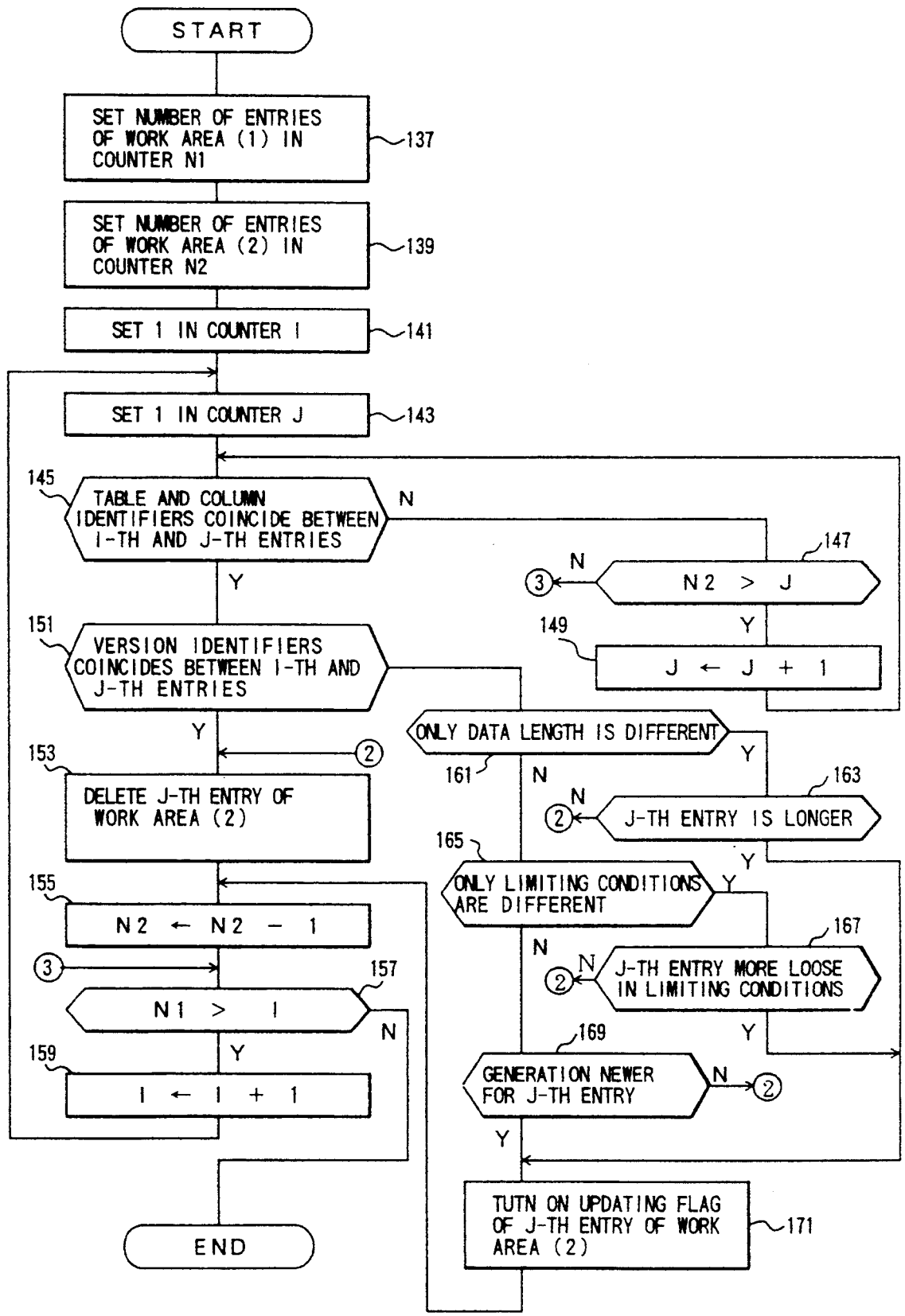
FIG. 6 is a flowchart showing a method of excluding duplicated structure definition data at step 121.

FIG. 6 is a flowchart showing a method of excluding the duplicated structure definition data at step 121 in FIG. 5.

The number of entries of the work area (1) 21 is set in the counter N1 (step 137), and the number of entries of the work area (2) 23 in the counter N2 (step 139). The number 1 is set in the counter I (step 141). The number 1 is set also in the counter J (step 143). It is decided whether there is a coincidence between the table identifier and the column identifier of the I-th entry of the work area (1) 21 or between the table identifier and the column identifier of the J-th entry of the work area (2) 23 (step 145). If there is no coincidence, it is decided whether the counter N2 is larger than the counter J or not (step 147). If the counter N2 is larger, the counter J is incremented by one (step 149), after which step 145 and subsequent steps are executed. If the counter N is smaller than the counter J, on the other hand, step 157 and subsequent steps are executed. In the case where there is a coincidence between the table identifier and the column identifier of the I-th entry of the work area (1) 21 or between the table identifier and the column identifier of the J-th entry of the work area (2) 23, it is decided whether there is a coincidence between the version identifier of the I-th entry of the work area (1)

21 and the version identifier of the J-th entry of the work area (2) 23 (step 151). If they coincide with each other, the structure definition data of the J-th entry is deleted, and succeeding entries, if any, are shifted toward smaller entry numbers each by one (step 153). The counter N2 is decremented by one (step 155), and it is decided whether the counter N1 is larger than the counter I (step 157). If larger, the counter I is incremented by one, followed by repetition of step 43 and subsequent steps. If the counter N1 is smaller than the counter I, by contrast, the process is terminated. If step 147 decides that the counter N2 is smaller than the counter J, it is decided whether only the data length is different while the data type remains the same of all the attributes (step 161). If only the data length is different, it is decided whether the J-th entry of the work area (2) 23 is longer in data length (step 163). If the J-th entry is longer in data length, step 170 and subsequent steps are executed, while if the J-th entry is shorter in data length, step 153 and subsequent steps are executed. If step 161 decides that the data length is also the same, it is decided whether only the limiting conditions are different of all the attributes (step 165). If only the limiting conditions are different, it is decided whether the limiting conditions are less strict for the J-th entry of the work area (2) 23 (step 167). If the limiting conditions of the J-th entry are more relaxed, step 170 and subsequent steps are executed, while if the J-th entry has stricter limiting conditions, step 153 and subsequent steps are executed. If step 165 decides that the limiting conditions are identical for the entries, it is decided whether the version identifier of the J-th entry of the work area (2) 23 indicates a new generation or not (step 169). If a new generation is indicated, the value on the counter I is set in the updating entry 23E of the J-th entry of the work area (2) 23 (step 171), after which step 155 and subsequent steps are executed. If step 169 decides that the version identifier of the J-th entry does not indicate a new generation, on the other hand, step 153 and subsequent steps are executed.

In the case where step 151 decides that the version identifier of the I-th entry of the work area (1) 21 fails to coincide with that of the J-th entry of the work area (2) 23, step 169 may be unconditionally executed, or the user instruction may be followed through the terminal 19. As a further alternative, step 161 or 165 may select a longer data length or more relaxed limiting conditions, or attributes may otherwise be combined. In other words, if different data have the same table identifier and column identifier, one of them may be left while discarding the other as a principle.

Figure 7:
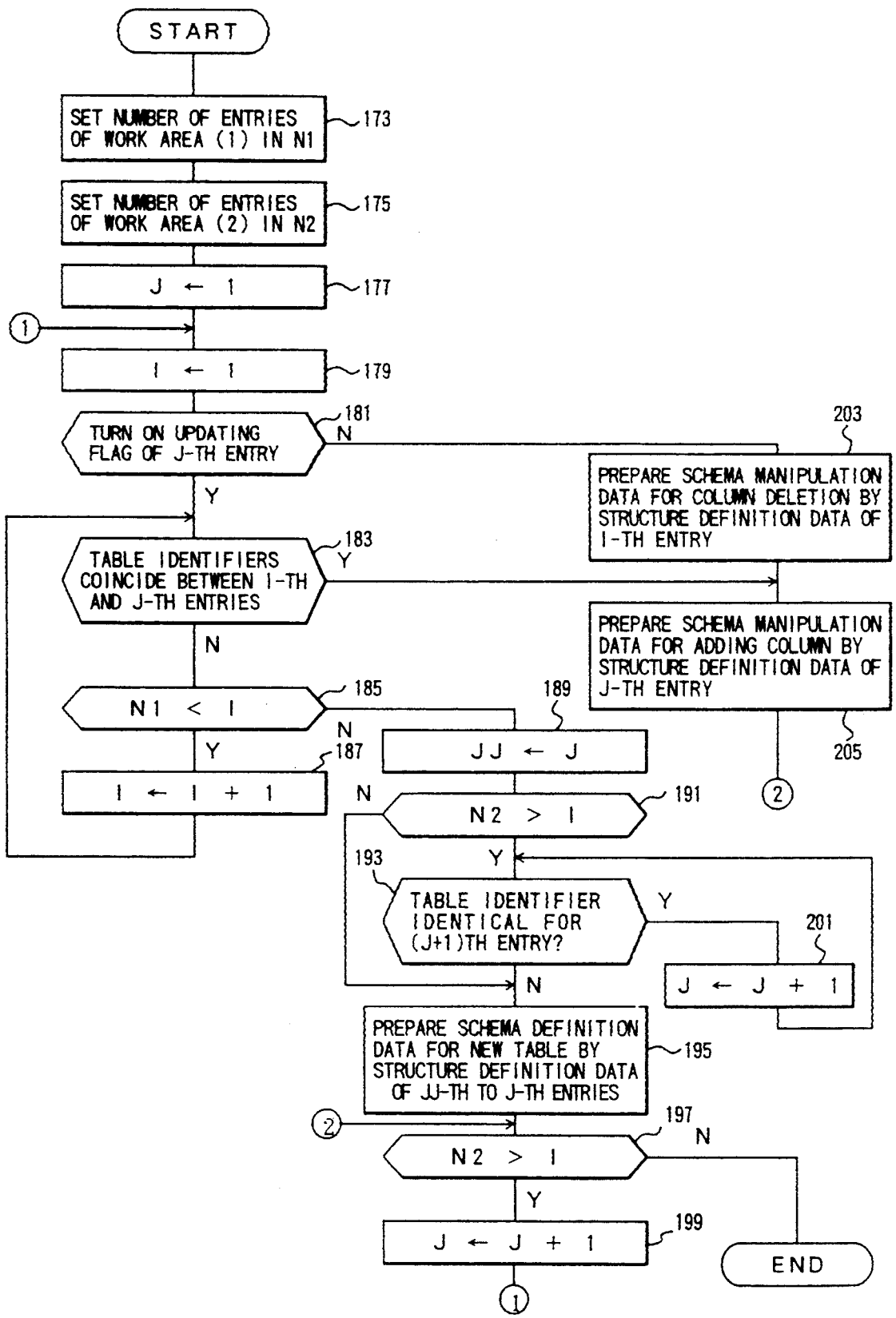
FIG. 7 is a flowchart showing a method of generating a schema operation data at step 125.

FIG. 7 is a flowchart showing a method of generating a schema manipulation data for incrementing the first dictionary from the additional integrated structure definition data of the work area (2) 23 at step 125 shown in FIG. 5.

The number of entries of the work area (1) 21 is set in the counter N1 (step 173), and the number of entries of the work area (2) 23 in the counter N2 (step 175). The number 1 is set in the counter J (step 177) and also in the counter I (step 179). it is decided whether the updating flag of the J-th entry of the work area (2) 23 is turned on or not (step 181). If other than an initial value is involved, a schema manipulation data for deleting a column by the structure definition data of the I-th entry of the work area (1) 21 is generated (step 203).

In the case of a database conforming to SQL2 of ISO, for instance, assume that a column which is contained in the table identifier $T_1$ and has the column identifier $C_{11}$ is dropped.

A schema manipulation data as shown below is prepared.

ALTER TABLE $T_1$
DROP $C_{11}$

As the next step, a schema manipulation data is prepared for new addition of a column by the structure definition data of the J-th entry of the work area (2) 23 (step 205).

In the case of the data conforming to SQL2 of ISO, for example, assume that the table name is set in the table of the table identifier $T_1$, the name of the column newly added is a column identifier $C_{12}$, the data type of the column is a character train, and the data length is 2 without any other attributes.

Then, a schema manipulation data as shown below is prepared.

ALTER TABLE $T_1$
ADD ($C_{12}$ CHAR (2))

After that, step 197 and subsequent steps are executed.

If step 181 decides that the updating flag of the J-th entry is turned on, it is decided whether the table identifier of the I-th entry of the work area (1) 21 coincides with that of the J-th entry of the work area (2) 23 (step 183). If they coincide with each other, step 205 and subsequent steps are executed, while if there is no coincidence therebetween, it is decided whether the counter N1 is larger than the counter I (step 185). If counter N1 is larger than the counter I, the counter I is incremented by 1 (step 187), followed by repetition of step 183 and subsequent steps. If the counter N1 is smaller than the counter I, on the other hand, the value on the counter J is set in the counter JJ (step 189), after which it is decided whether the counter N2 is larger than the counter J (step 191). If the counter N2 is smaller than the counter J, step 195 and subsequent steps are executed, while if the counter N2 is larger than the counter J, it is decided whether the version identifier of the I-th entry of the work area (1) 21 coincides with that of the J-th entry of the work area (2) 23 (step 193). If the version identifier of the I-th entry of the work area (1) 21 coincides with that of the J-th entry of the work area (2) 23, the counter J is incremented by one (step 201), after which step 193 and subsequent steps are executed. If they fail to coincide with each other, on the other hand, a schema definition data of the new table is prepared by the structure definition data from the JJ-th to J-th entries of the work area (2) 23 (step 195). The contents prepared are the same as those at the time of creation of the first dictionary, and will not be described again.

As the next step, it is decided whether the counter N2 is larger than the counter J (step 197). If the counter N2 is larger than the counter J, the counter J is incremented by one (step 199), after which step 179 and subsequent steps are executed. If the former is smaller, this process is terminated.

Figure 8:
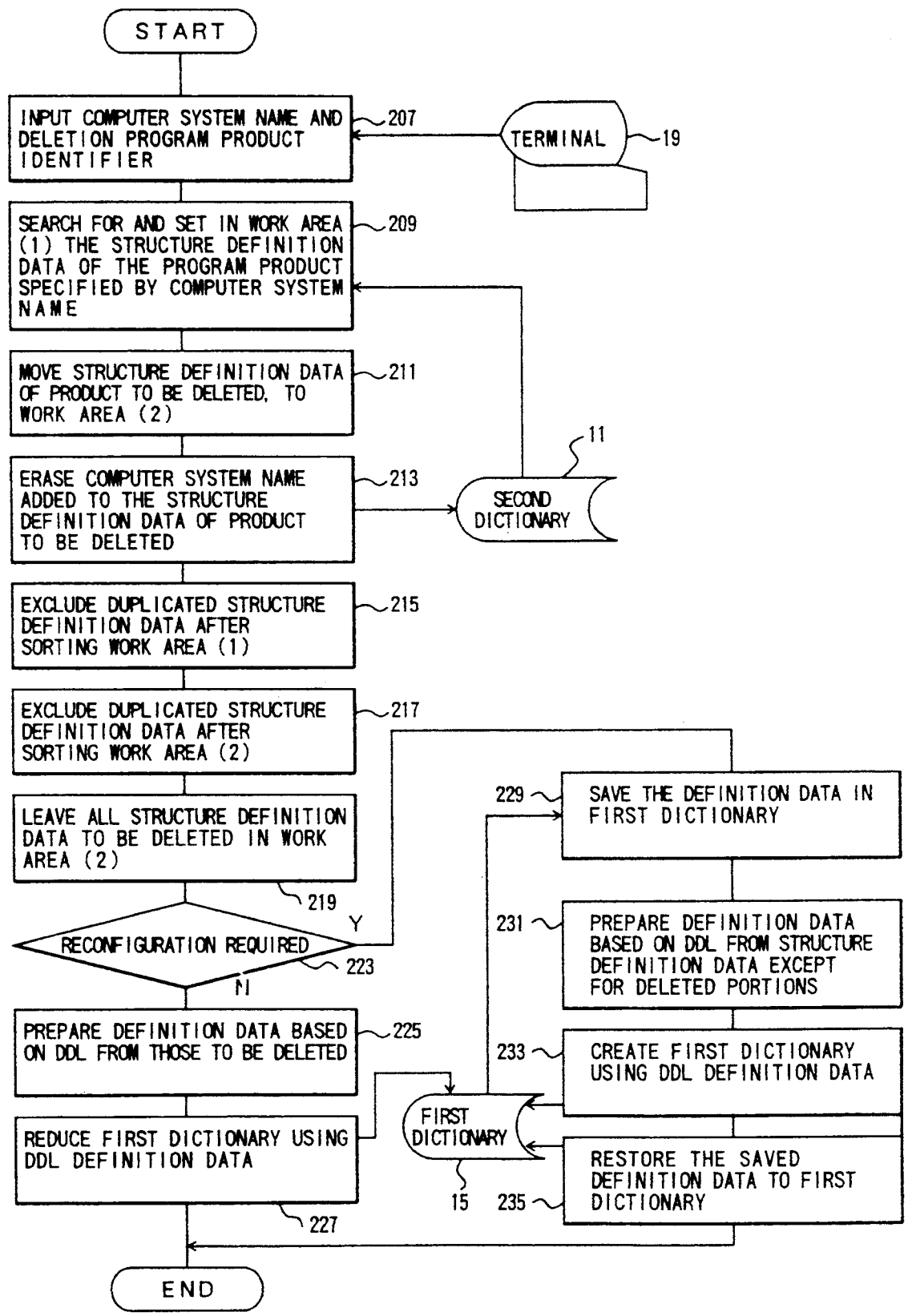
FIG. 8 is a flowchart showing the processing sequence of a module for reducing the first dictionary of the computer systems shown in FIG. 1.

FIG. 8 is a flowchart showing the processing operation of a first dictionary reducing module 5C of FIG. 1.

Upon invoking this module, the computer system name and the deletion program product identifier making up operands of the first dictionary reducing command are read from the terminal 19 (step 207). With a designated computer system name as a key, the second dictionary is searched for a structure definition data of the program product specified by the particular computer system name, and the resulting data is set in the work area (1) 21 of FIG. 1 (step 209). As the next step, the structure definition data of the designated deletion program product is transferred to the work area (2) 23 of FIG. 1 (step 211), followed by deletion of the computer system name added to the structure definition data in the second dictionary 11 (step 213). As in the step 61 in FIG. 2, the structure definition data of the work area (1) 21 of FIG. 1 is sorted by the table identifier, column identifier and the version identifier while at the same time excluding any duplications (step 215). In similar fashion, the structure definition data of the work area (2) 23 in FIG. 1 is sorted by the table identifier, column identifier and the version identifier, while at the same time excluding duplications (step 217). Of all the structure definition data of the work area (2) 23 in FIG. 1, those shared by other program products and therefore impossible to delete are excluded (step 219). This process is performed in the same manner as in FIG. 6. The remaining structure definition data will be called the deleted integral structure definition data for discrimination. The structure definition data obtained at step 215, on the other hand, are discriminated by being called the remaining integrated structure definition data.

As the next step, it is decided whether the reduction in the first dictionary by the deleted integrated structure definition data requires a reconfiguration of the first dictionary (step 223). Whether the reconfiguration is required or not depends on the ability of the database management system. The present embodiment is realizable regardless of whether the reconfiguration is required or not, as mentioned below.

If step 223 decides that the reduction in the first dictionary by the deleted integrated structure definition data does not require a reconfiguration of the first dictionary, a schema manipulation data is generated for reducing the first dictionary by the schema manipulation language from the deleted integrated structure definition data (step 225). By sending this schema manipulation data to the database management system 7 for execution (step 227), it is possible to reduce the first dictionary. In the case where step 223 decides that the reduction in the first dictionary by the deleted integrated structure definition data requires the reconfiguration of the first dictionary, the definition data in the first dictionary is saved in the first place (step 229). The place of saving may be either an external memory unit such as magnetic tape or magnetic disk, or the main memory unit 3 in FIG. 1 or an incremental memory unit. A schema definition data is generated for creating the first dictionary by the schema definition language from the remaining integrated structure definition data (step 231), which data is sent to the database management system 7 in FIG. 1 for execution thereby to create the first dictionary (step 233). Before the creation of the first dictionary, first dictionaries specified by the same computer system name are deleted. It is possible to reduce the first dictionary by reregistering the saved definition data with the new first dictionary (step 235).

Figure 9:
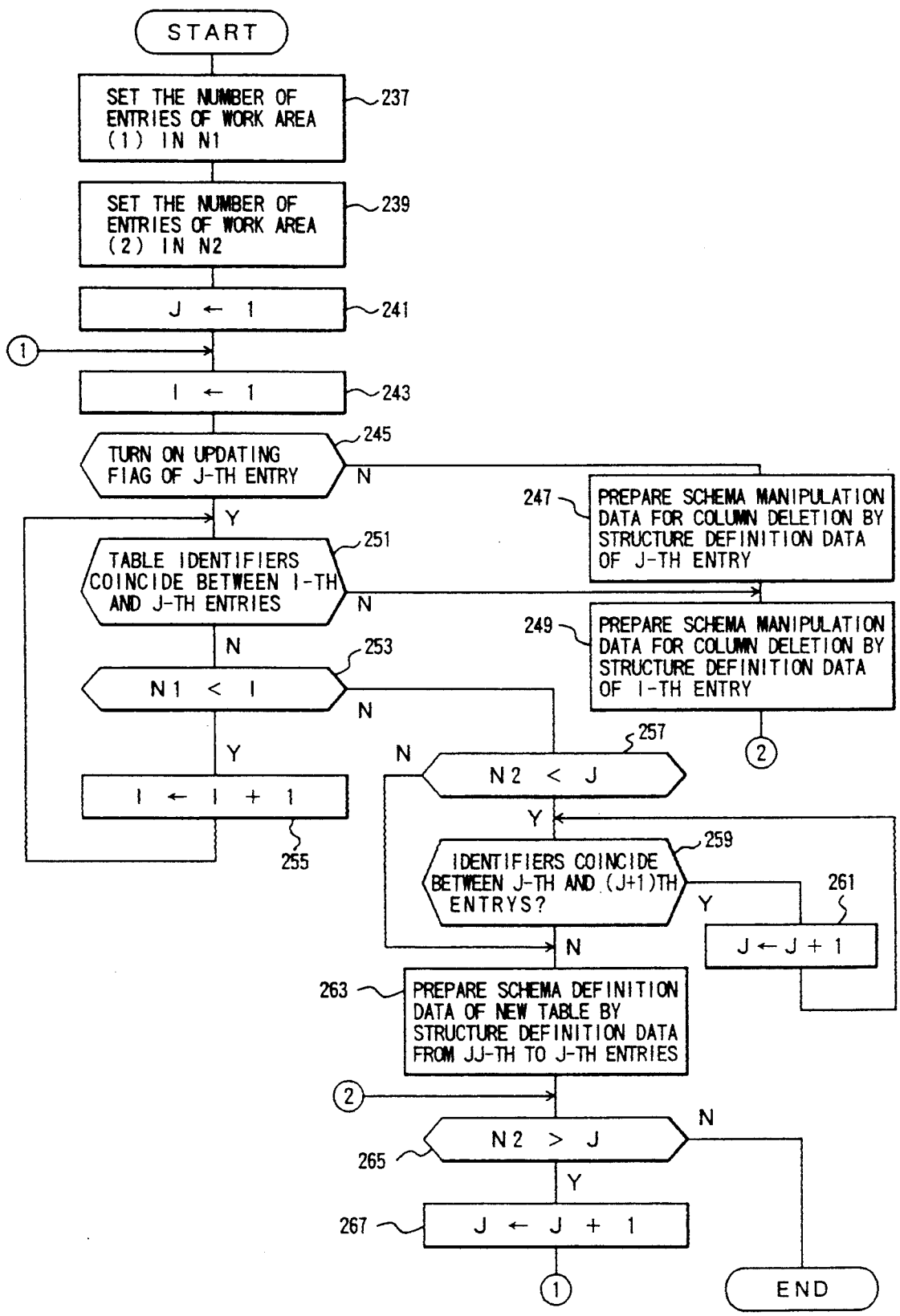
FIG. 9 is a flowchart showing a method of reducing the first dictionary at step 225 in FIG. 8.

FIG. 9 is a flowchart showing a method of reducing the first dictionary by the deleted integrated structure definition data of the work area (2) 23 in FIG. 1 at step 225 shown in FIG. 8.

The number of entries of the work area (1) 21 of FIG. 1 is set in the counter N1 (step 237), and the number of entries of the work area (2) 23 of FIG. 1 in the counter N2 (step 239). The number 1 is set in the counter J (step 241), and the number 1 also in the counter I (step 243). It is decided whether the updating flag of the J-th entry of the work area (2) 23 in FIG. 1 is turned on or not (step 245). If the flag is not turned on, a schema manipulation data is prepared for deleting the column by the structure definition data of the J-th entry of the same work area (2) 23. The nature of this data, which is identical to the one for incrementation (step 203 in FIG. 7), will not be described again.

As the next step, a schema manipulation data is prepared for newly adding a column by the structure definition data of the I-th entry of the work area (1) 21 in FIG. 1 (step 249). The nature of this data is also identical to the one for incrementation of the first dictionary (step 204 in FIG. 7) and will not be described again.

Subsequently, step 265 and subsequent steps are executed. If the updating flag is turned on at step 245, it is decided whether the table identifier of the I-th entry of the work area (1) 21 in FIG. 1 coincides with that of the J-th entry of the work area (2) 23 (step 251). If the two identifiers coincide with each other, step 249 and subsequent steps are executed. Otherwise, it is decided whether the counter N1 is larger than the counter I (step 253). If the counter N1 is larger, the counter I is incremented by one (step 255), after which step 251 and subsequent steps are repeated, while if the counter N1 is smaller, it is decided whether the counter N2 is larger than the counter J (step 257). If the counter N2 is smaller than the counter J, on the other hand, step 263 and subsequent steps are executed, while if the counter N2 is larger, it is decided whether the table identifier of the J-th entry of the work area (2) 23 in FIG. 1 coincides with that of the (J+1)th entry (step 259). If they coincide, the counter J is incremented by one (step 261), after which step 259 and subsequent steps are executed. If the two table identifiers fail to coincide, a schema manipulation data of the table to be deleted is prepared by the structure definition data of the J-th entry of the work area (2) 23 in FIG. 1 (step 263).

In the case of a database conforming to SQL2 of ISO, for example, assume that the name of the table to be deleted provides a table identifier $T_1$. A schema manipulation data is prepared as shown below.

DROP TABLE $T_1$

As the next step, it is decided whether the counter N2 is larger than the counter J (step 265). If the counter N2 is larger, the counter J is incremented by one (step 267), followed by execution of step 243 and subsequent steps. If the counter N2 is smaller, on the other hand, the process under consideration is terminated.

Figure 10:
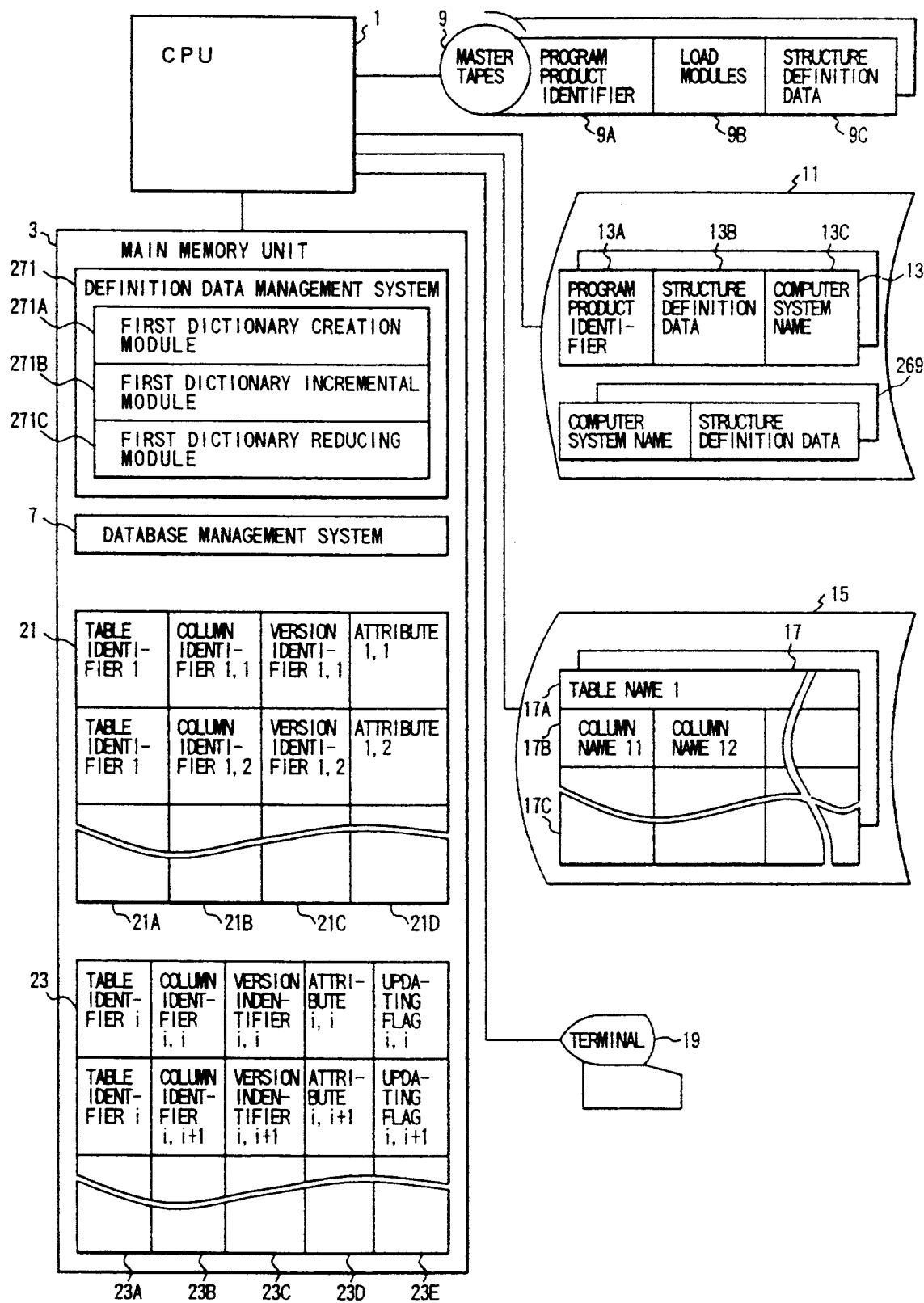
FIG. 10 is a block diagram showing a general configuration of a computer system according to a second embodiment of the present invention.

FIG. 10 is a block diagram showing a configuration of a management system according to a second embodiment of the present invention.

In contrast to the first embodiment in which the integrated structure definition data resulting from the exclusion of duplications of the structure definition data of the program products specified by a computer system are not registered with the second dictionary, the second embodiment is such that the integrated structure definition data is registered with the second dictionary, with the result that the capacity of the second dictionary is increased while improving the processing performance at the same time.

In the configuration of the second embodiment, an integrated structure definition data record 269 is registered anew in addition to the structure definition data record 13 managed in the second dictionary configured according to the first embodiment shown in FIG. 1. Also, in view of the fact that the integrated structure definition data is registered with the second dictionary, the nature of processing each program of the first dictionary creating module 271A, the first dictionary incremental module 271B and the first dictionary reducing module 271C of the definition data management system 271 is different from those in the first embodiment. Since the remaining points are identical to those in the first embodiment, the explanation that follows will deal with only the processing of the first dictionary creating module 271A, the first dictionary incremental module 271B and the first dictionary reducing module 271C.

Figure 11:
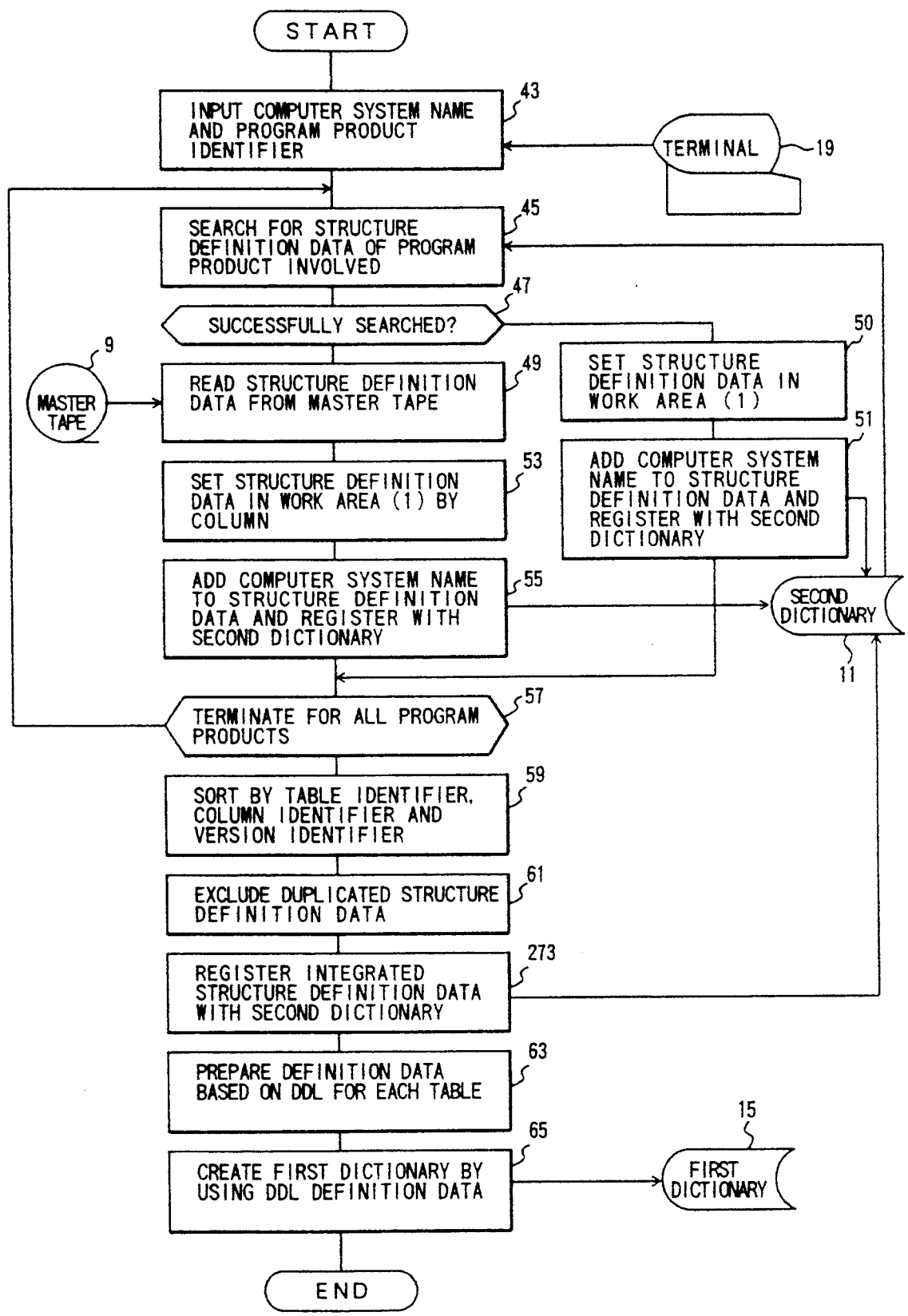
FIG. 11 is a flowchart showing the operation sequence of a module for creating a first dictionary of a computer system according to the second embodiment in FIG. 10.

FIG. 11 is a flowchart showing the processing operation of a first dictionary creating module 271A in FIG. 10 according to the second embodiment of the present invention.

The steps other than step 273 are similar to corresponding steps in FIG. 3 according to the first embodiment and therefore will not be described.

In this module, the integrated structure definition data obtained by execution of step 61 in FIG. 3 is registered with the second dictionary with a designated computer system name as a key (step 273).

Figure 12:
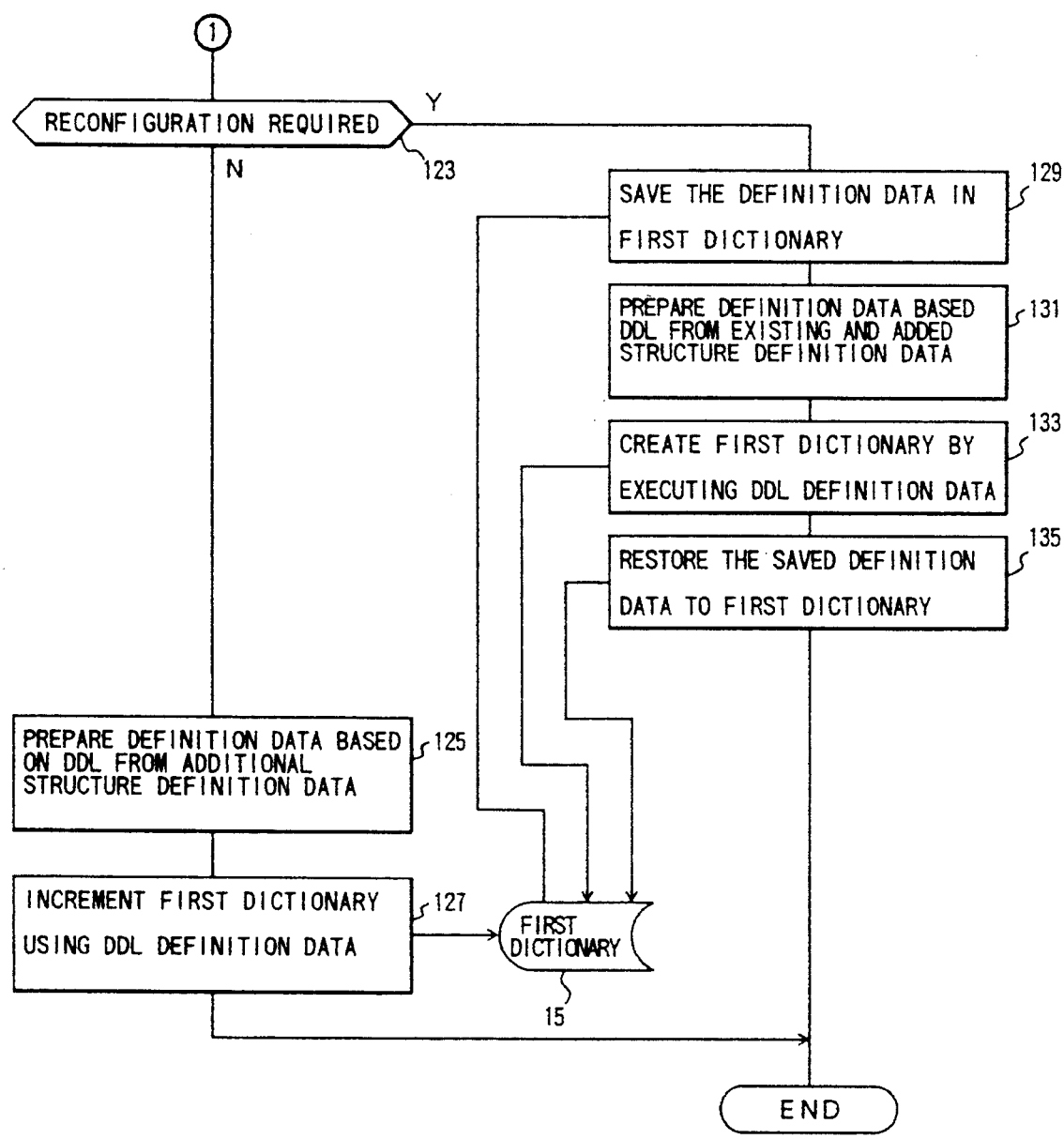
FIGS. 12A and 12B are flowcharts showing the operation sequence of a module for incrementing the first dictionary of a computer system according to the second embodiment in FIG. 10.

FIG. 12 is a flowchart showing the processing operation of the first dictionary incremental module 271B in FIG. 10 according to the second embodiment of the present invention.

This operation is the same as that of the first embodiment shown in FIG. 5 except for steps 275 and 277 and the deletion of step 117 in FIG. 5, and will not be described again.

In this module, with the computer system name obtained at step 99 as a key, the second dictionary is searched for an integrated structure definition data, which is then set in the work area (1) 21 in FIG. 10 (step 275).

If the structure definition data for designating all additional program products are set in the work area (2) 23 of FIG. 23 at step 115, step 119 is executed without executing step 117 in FIG. 5.

After step 121, the structure definition data of the work area (2) 23 in FIG. 10 is added to the work area (1) 21 of FIG. 10, and the integrated structure definition data of the same name as the computer system name designated at step 99 in the second dictionary is replaced by a new integrated structure definition data obtained by sorting the structure definition data and excluding duplicated portions as executed at step 61 in FIG. 2 in the first embodiment.

Figure 13:
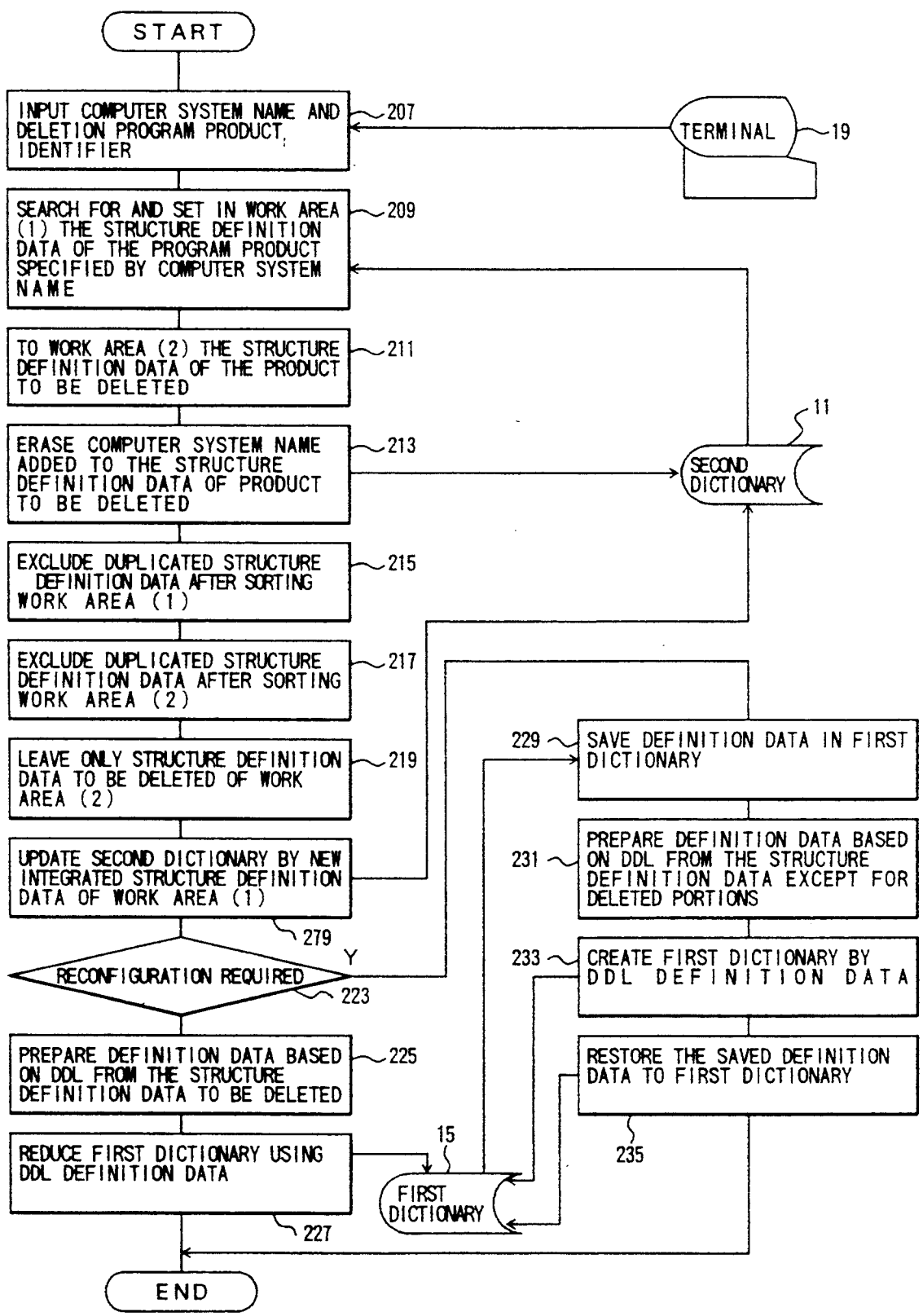
FIG. 13 is a flowchart showing the operation sequence of a module for deleting a first dictionary of a computer system according to the second embodiment shown in FIG. 10.

FIG. 13 is a flowchart showing the processing operation of the first dictionary reducing module 271C according to the second embodiment shown in FIG. 10.

The operation of this module is substantially the same as in FIG. 8 of the first embodiment. Therefore, only the differences will be explained.

In this module, the integrated structure definition data having the same name as the computer system name designated at step 207 in the second dictionary is replaced by the new integrated structure definition data of the work area (1) 21 in FIG. 10 obtained by deleting appropriate portions from the existing integrated structure definition data (step 279). The other operations are identical to those in FIG. 8.

As described above, according to the present embodiment, a first dictionary is created for registering a definition data specifying the nature of execution of all the program products making up a computer system and an operation data including location and use management data of a recording medium and a data for monitoring the execution process.

In the prior art, in order to provide for the fact that different computer systems have different "vendors" including the soft house or the type of the program product making up the particular computer system, different definition data management systems are realized for different related program products or product combinations. As a result, definition data are duplicated or mismatching occurs between different definition management systems. According to the present embodiment, on the other hand, the integral management of the definition data and the operation data with a specified nature of execution of each program product is made possible by the first dictionary, thus saving the trouble of registering the definition data in duplicated manner for program products or matching the definition data. Further, the definition data and the operation data may be managed integrally.

Furthermore, the structure of the first dictionary may be incremented in order to increase the types of definition data that can be managed thereby. There is no need of recreating the first dictionary each time of increase in the program products making up the component elements of a computer system.

In addition, since it is possible to reduce the number of definition data to be managed by the existing first dictionary, the structure of the first dictionary is reduced. Also, the disuse of program products that have thus far made up component elements of a computer system eliminates the need of recreating a first dictionary.

What is more, if the structure definition data of the existing first dictionary is managed separately, the trouble is saved of combining the structure definition data of the whole computer system at the time of incrementing the first dictionary by addition of new program products, thus improving the performance of incrementation.

It will thus be understood from the foregoing description that according to the present invention, the definition data and operation data of a computer system realized by various combinations of program products are integrally managed by a first dictionary, so that the duplicated registrations of definition data and the trouble of managing the matching between definition data are eliminated, thereby realizing an efficient definition data management system.

What is claimed is:

1. A method executed by a computer of creating a dictionary representing data structures for a plurality of program products, each of the plurality of program products including structure definition data associated therewith defining a database structure, the dictionary comprising a first dictionary for registering a definition data of each of the plurality of program products, defining proper execution of the program products and a second dictionary for storing the structure definition data defining the database structure of the first dictionary, said method comprising the steps of:

receiving a plurality of structure definition data from a plurality of program products into the computer;

storing said plurality of structure definition data into a second dictionary of the computer;

receiving a first dictionary creating request input into the computer from a user;

retrieving said plurality of structure definition data from said second dictionary in response to said first dictionary creating request recognizing and excluding duplicated structure definition data retrieved from said second dictionary by comparing each structure definition data of said plurality of program products with others of said structure definition data of said plurality of program products plurality of program; and, creating the first dictionary using a one of a data definition language and a data description language operated upon by a database management system of said computer in accordance with the structure definition data remaining after excluding the duplicated structure definition data.

2. The method of creating a dictionary according to claim 1, wherein:

said step of storing the plurality of structure definition data into said second dictionary includes the step of storing a program product identifier for each of the plurality of structure definition data; and, said step of creating the first dictionary includes the step of retrieving the plurality of structure definition data from said second dictionary on a basis of selected program product identifiers which are designated in said first dictionary creating request inputted into the computer from said user.

3. The method of creating a dictionary according to claim 1, wherein said step of receiving the structure definition data includes the step of reading the structure definition data from a master tape storing each of the plurality of program products and storing the structure definition data in the work area of the memory unit and second dictionary.

4. The method of creating a dictionary according to claim 3, wherein:

said step of reading the structure definition data from the master tape includes the step of collectively reading structure definition data of a plurality of the program products; and, said step of receiving structure definition data includes a step of reading the structure definition data of the plurality from the master tape.

5. The method of creating a dictionary according to claim 1, wherein said step of receiving the first dictionary request for creating a first dictionary includes the step of receiving at least a name specifying a program product having the structure definition data and a name specifying a group of said program products.

6. The method of creating a dictionary according to claim 1, further comprising the steps of:

receiving a first dictionary incrementation demand into the computer from the user;

receiving second structure definition data from a second plurality of program products into the computer;

eliminating duplicated portions of the structure definition data, used to create said first dictionary, from said second structure definition data corresponding to new program products in response to said first dictionary incrementation demand by comparing the structure definition data of the newly added program product to the existing structure definition data.

7. The method of creating a dictionary according to claim 1, further comprising deleting a structure definition data of a program product required to be deleted in response to a demand for reducing the first dictionary with the deletion of a given program product, by deleting only those structure definition data not shared with the structure definition data of other program products in said computer to reduce the first dictionary.

8. The method according to claim 1, wherein said step of excluding duplicate structure definition data includes a step of comparing attributes of different structure definition data and deleting near duplicate structure definition data by eliminating a first structure definition data whose attributes are the same as a second structure definition data except for a different generation identifier and shorter data length.

9. The method according to claim 1, further comprising a step of comparing attributes of different structure definition data and deleting near duplicate structure definition data by eliminating a first structure definition data whose attributes are the same as a second structure definition data except for a different generation identifier associated therewith.

10. The method according to claim 1, further comprising a step of comparing attributes of different structure definition data and deleting near duplicate structure definition data by eliminating a first structure definition data which table and column names are the same as a second structure definition data but which has an older generation identifier associated therewith.

11. The method according to claim 1, further comprising a step of deciding whether a reconfiguration of the existing first dictionary is necessary in response to a first dictionary incrementation demand inputted into the computer from said user, and if necessary, a step of saving the first dictionary data to memory unit means, and a step of restoring said data back into the first dictionary after the reconfiguration.

12. The method according to claim 1, further comprising a step of deciding whether a reconfiguration of the existing first dictionary is necessary in response to a demand for reducing the first dictionary inputted into the computer from said user, and if necessary, a step of saving the first dictionary data to memory unit means, and a step of restoring said data back into the first dictionary after reconfiguration.

13. The method of creating a dictionary according to claim 1, further comprising the steps of:

registering all structure definition data which are used to create the first dictionary and storing a name specifying each registered structure definition data into the second dictionary;

excluding a duplicate structure definition data of said second dictionary, and comparing the structure definition data of an added program product to said registered structure definition data to extract a duplicated structure definition data in response to a demand inputted into the computer from said user for incrementing the first dictionary with said name.

14. The method of creating a dictionary according to claim 1, further comprising the steps of:

registering all structure definition data which are used to create the first dictionary and storing a name specifying each registered structure definition data into the second dictionary, and excluding a duplicate structure definition data of said second dictionary, and comparing the structure definition data of a dropped program product to said registered structure definition data to extract an unnecessary structure definition data in response to a demand inputted into the computer from said user for reducing the first dictionary with said name.

15. A method of definition data management in a computer system adapted to execute a program product structure formed of a plurality of program products, the computer system including: a first dictionary for registering definition data required by each of the plurality of program products during system operation; a second dictionary for storing structure definition data, the structure definition data defining a structure of the first dictionary and including a program product identifier, a table name and a column name assigned to each definition data in the first dictionary; a processing unit executing a plurality of utility operations including a first dictionary creating module, a first dictionary incrementing module and a first dictionary reducing module; a first system work area; a database management system; and, a terminal for receiving commands from a user into the computer system, the method comprising the steps of:

inputting into the system a first command from said user;

interpreting the inputted first command as a creation command for creating the first dictionary;

executing said first dictionary creating module, when the inputted command is interpreted as said creation command, to create said first dictionary by:

reading a program product identifier operand and a computer system name operand from said creation command; and, searching said second dictionary for first structure definition data corresponding to a first program product identifier matching said program product identifier operand and when the first program product identifier in said second dictionary matching said program product identifier operand is found, copying said first structure definition data corresponding to the first program product identifier from said second dictionary to said first system work area as stored structure definition data, adding said computer system name operand to the stored structure definition data in said first system work area and storing said computer system name operand in said second dictionary in association with said first structure definition data;

generating an integrated structure definition data having reduced extraneous data in said first system work area by sorting the stored structure definition data in said first system work area by table name and column name;

based on both i) said integrated structure definition data and ii) a one of a data definition language and a data description language particular to said database management system of said computer system, generating schema definition data for ready importation into the database management system for creating the first dictionary; and, creating the first dictionary by executing the database management system using the schema definition data, the first dictionary registering definnition data required by each of the plurality of program products during system operation.

16. The method of definnition data management in a computer system according to claim 15 wherein said sorting step includes:

comparing each table name and column name of the stored structure definition data in said first system work area to determine a first coincidence; and, when the first coincidence is found, deleting duplicated stored structure definition data from said first system work area.

17. The method of definition data management in a computer system according to claim 16 wherein said sorting step includes:

comparing a version number of each stored structure definition data to determine a second coincidence when said first coincidence is found; and, when the second coincidence is found, deleting older duplicated stored structure definition data from said first system work area.

18. The method of definition data management in a computer system according to claim 17 wherein aid sorting step includes:

comparing a data length of each data stored in columns defined by said structure definition data to determine a third coincidence when said first coincidence is found in an absence of said second coincidence; and, when the third coincidence is found, deleting shorter duplicated data stored in said columns defined by said structure definition data from said first system work area.

19. A method of definition data management in a computer system adapted to execute a program product structure formed of a plurality of program products, the computer system including: a first dictionary for registering definition data required by each of the plurality of program products during system operation; a second dictionary for storing structure definition data, the structure definition data defining a structure of the first dictionary and including a first program product identifier, a table name and a column name assigned to each definition data in the first dictionary; a processing unit executing a plurality of utility operations including a first dictionary creating module, a first dictionary incrementing module and a first dictionary reducing module; a first system work area; a second system work area; a database management system; and, a terminal for receiving commands from a user into the computer system, the method comprising the steps of:

inputting into the system a first command from said user;

interpreting the inputted first command as an increment operation command for enlarging the first dictionary;

executing said first dictionary incrementing module, when the inputted command is interpreted as said increment operation command, to enlarge said first dictionary by:

reading an additional program product identifier operand and a computer system name operand from said increment operation command;

searching said second dictionary for first structure definnition data corresponding to a first computer system name matching said computer system name operand and storing the first structure definition data in said first system work area as first stored structure definition data when the first computer system name matching said computer system name operand is found; and, searching said second dictionary for second structure definition data corresponding to a program product identifier matching said additional program product identifier operand and when the program product identifier matching said additional program product identifier operand is found, storing the second structure definition data in said second system work area as second stored structure definition data, and adding said computer system name operand to the stored structure definition data in said second system work area;

sorting the stored first structure definition data in said first system work area by table name and column name to generate a first integrated structure definition data having a reduction of extraneous data in said first system work area;

sorting the stored second structure definition data in said second system work area by table name and column name to generate a second integrated structure definition data having a reduction of extraneous data in said first system work area;

based on i) said first and second integrated structure definition data and ii) a one of a data definition language and a data description language particular to said database management system of said computer system, generating schema definition data for ready importation into the database management system to enlarge the first dictionary; and, enlarging the first dictionary by executing the database management system using the schema definition data to add to the first dictionary, the first dictionary registering definition data required by each of the plurality of program products during system operation.

20. The method of definition data management in a computer system according to claim 15 wherein said searching step includes the step of:

when said first program product identifier in said second dictionary matching said program product identifier operand is to found, reading into the system second structure definition data from a master tape unit connected to the system, storing the second structure definition data in said second dictionary and in said first system work area as said stored structure definition data, adding said computer system name operand to the stored structure definition data in said first system work area and storing said computer system name operand in said second dictionary in association with said stored structure definition data.

21. The method of definition data management in a computer system according to claim 20 wherein said sorting step includes:

comparing each table name and column name of the stored structure definition data in said first system work area to determine a first coincidence; and, when the first coincidence is found, deleting duplicated stored structure definition data from said first system work area.

22. The method of definition data management in a computer system according to claim 21 wherein said sorting step includes:

comparing a version number of each stored structure definition data to determine a second coincidence when said first coincidence is found; and, when the second coincidence is found, deleting older duplicated stored structure definition data from said first system work area.

23. The method of definition data management in a computer system according to claim 22 wherein said sorting step includes:

comparing a data length of each data stored in columns defined by said structure definition data to determine a third coincidence when said first coincidence is found in an absence of said second coincidence; and, when the third coincidence is found, deleting shorter duplicated data stored in said columns defined by said structure definition data from said first system work area.

24. The method of definition data management in a computer system according to claim 19 wherein said step of searching said second dictionary includes the step of:

when said program product identifier matching said additional program product identifier operand is not found, reading into the system second structure definnition data from a master tape unit connected to the system, storing the second structure definition data in said second dictionary and in said second system work area as said stored structure definition data, and adding said computer system name operand to the stored structure definition data in said second system work area.

25. The method of creating a dictionary according to claim 1, wherein said retrieving step includes the step of receiving at least one of said plurality of structure definition data from an associated program product into the computer, if said at least one of said plurality of structure definition data is not stored in said second dictionary.

* * * * *

UNITED STATES PATENT AND TRADEMARK OFFICE
CERTIFICATE OF CORRECTION

PATENT NO. : 5,375,237
DATED : December 20, 1994
INVENTOR(S) : Kazuaki Tanaka, et al.

It is certified that error appears in the above-indentified patent and that said Letters Patent is hereby corrected as shown below:

Claim 1, column 21, line 9, after "request" insert --;--.

Claim 15, column 23, line 68, delete "definnition" and substitute therefor --definition--.

Claim 16, column 24, line 3, delete "definnition" and substitute therefor --definition--.

Claim 18, column 24, line 22, delete "aid" and substitute therefor --said--.

Claim 19, column 24, line 64, delete "definnition" and substitute therefor --definition--.

Claim 20, column 25, line 45, delete "to" and substitute therefor --not--.

Claim 24, column 26, line 40, delete "definnition" and substitute therefor --definition--.

Signed and Sealed this

Twenty-eight Day of February, 1995

*Attest:*

BRUCE LEHMAN

*Attesting Officer*  *Commissioner of Patents and Trademarks*